(12) United States Patent
Ryspekov

(10) Patent No.: US 12,099,462 B1
(45) Date of Patent: Sep. 24, 2024

(54) DYNAMIC PROCESSOR ARCHITECTURE

(71) Applicant: Chariot Technologies Lab, Inc., Wilmington, DE (US)

(72) Inventor: Timur Ryspekov, London (GB)

(73) Assignee: Chariot Technologies Lab, Inc., Wilmington, DE (US)

( * ) Notice: Subject to any disclaimer, the term of this patent is extended or adjusted under 35 U.S.C. 154(b) by 0 days.

(21) Appl. No.: 18/534,411

(22) Filed: Dec. 8, 2023

(51) Int. Cl.
*G06F 15/80* (2006.01)
*G06F 9/38* (2018.01)
*G06F 15/78* (2006.01)
*G06F 9/30* (2018.01)

(52) U.S. Cl.
CPC ........ *G06F 15/7867* (2013.01); *G06F 9/3897* (2013.01); *G06F 9/3001* (2013.01)

(58) Field of Classification Search
CPC ... G06F 15/7867; G06F 9/3897; G06F 9/3001
See application file for complete search history.

(56) References Cited

U.S. PATENT DOCUMENTS

| | | | |
|---|---|---|---|
| 5,426,378 A | 6/1995 | Ong | |
| 6,996,709 B2* | 2/2006 | Arnold | G06F 9/3897 326/38 |
| 8,112,468 B1 | 2/2012 | Redgrave et al. | |
| 9,146,896 B2* | 9/2015 | Furukawa | G06F 9/3879 |
| 9,244,883 B2* | 1/2016 | Park | G06F 9/30189 |
| 9,654,111 B1 | 5/2017 | Muchsel et al. | |
| 10,528,356 B2* | 1/2020 | Chen | G06F 9/3834 |
| 10,853,541 B1* | 12/2020 | Joshi | G06F 30/327 |
| 11,029,920 B1 | 6/2021 | Ryspekov | |
| 11,921,667 B2* | 3/2024 | Huang | G06N 3/0464 |
| 2007/0168718 A1* | 7/2007 | Reblewski | H03K 19/17764 714/15 |
| 2009/0070552 A1* | 3/2009 | Kanstein | G06F 15/7867 717/140 |

(Continued)

FOREIGN PATENT DOCUMENTS

EP 2279560 9/2016

OTHER PUBLICATIONS

Babu et al., "Reconfigurable FPGA Architectures: A Survey and Applications," J. Inst. Eng. India, Nov. 17, 2020, 102(1): 143-156.

(Continued)

*Primary Examiner* — Corey S Faherty
(74) *Attorney, Agent, or Firm* — Fish & Richardson P.C.

(57) ABSTRACT

Methods, systems, and apparatus, including medium-encoded computer program products, for implementing a dynamic processor architectures include, in one or more aspects of the subject matter described in this specification, an apparatus including: switches coupled with computing elements in a hardware processor to enable selective formation of one or more cores from the computing elements in the hardware processor; and means for dynamically determining how many of the one or more cores to form in the hardware processor, by provision of control signals to the switches, to execute instructions of one or more computer programs based on (i) a current set of the instructions to be executed and (ii) a current set of the computing elements available for processing instructions.

16 Claims, 19 Drawing Sheets

(56) References Cited

U.S. PATENT DOCUMENTS

2022/0129320 A1* 4/2022 Mohapatra ............ G06F 15/825

OTHER PUBLICATIONS

Scalera et al., "The Design and Implementation of a Context Switching FPGA," Sanders, A Lockheed Martin Company, Oct. 2008, 8 pages.

Shields Neely, "Reconfigurable Logic for Systems on a Chip," IEEE Xplore, Feb. 23-26, 1998, 1 page.

Tommiska et al., "Dijkstra's Shortest Path Routing Algorithm in Reconfigurable Hardware," Proceedings of the 11th Conference on Field-Programmable Logic and Applications, Aug. 2001, 6 pages.

Watkins et al., "Enabling Parallelization via a Reconfigurable Chip Multiprocessor," 2010, 10 pages.

* cited by examiner

DYNAMIC PROCESSOR ARCHITECTURE

BACKGROUND

Technical Field

This specification relates to computer processors, and particularly to the efficiency and architecture of the computer processors.

Description of Related Art

Computer technology is likely close to reaching its physical limits regarding the size of components for data storage and computer processors. For example, demand for computing power continues to rise, making processor needs increasingly high, which challenges the abilities of even cutting-edge silicon production to keep up with the demands. As a result, even amidst advances in technology, a strong need exists for more productive processors (e.g., within the existing technology nodes) that require fewer transistors and can be smaller in size as a result but demonstrating the same or even higher performance. Modern processors have typically static architectures meaning that a given number of transistors is used as components for a fixed number of logic gates that form a fixed number of logic gate sets of any kind (i.e., bitwise operation units, adders, encoders, etc.) composing a fixed number of arithmetic logic units and computing cores of the processor. Thereby, conventional architectures have a permanent ("frozen") structure, hard-coded and formed at the time of designing and manufacturing the processor (e.g., CPUs or GPUs, etc.), which does not make them universally efficient in processing of a huge variety of specific and/or complex algorithms. Another widespread example of the static architecture is an application-specific integrated circuit (or ASIC)—a circuit specifically tailored to execute certain types of algorithms in a best possible way but unable to (efficiently) perform many other tasks. Similarly, field-programmable gate arrays (or FPGAs) give the possibility to reprogram a processor architecture for efficient execution of certain functions/algorithms, but the process of reconfiguration of processor's internal interconnections takes time (e.g., upload time or reconfiguration time) and the architecture formed after reprogramming is in any case static and therefore not optimal for execution of all types of instructions (as in the case with ASIC).

SUMMARY

This specification describes technologies relating to dynamic or "metamorphic" (aka self-changing or reconfigurable) processor architectures, which can overcome the static nature of traditional processor architectures that can become a bottleneck for efficient use of computing resources (e.g., transistors), thereby improving the productivity of processors using the dynamic systems and/or techniques described in this application.

In general, one or more aspects of the subject matter described in this specification can be embodied in one or more methods (and also one or more non-transitory computer-readable mediums tangibly encoding a computer program operable to cause data processing apparatus to perform operations) including: receiving a set of instructions to be run on a computer comprising computing elements in a hardware processor of the computer and physical interconnections for the computing elements, wherein the set of instructions collectively define a search space of possible settings of the physical interconnections for the computing elements; analyzing at least the set of instructions, as a set of arithmetic operations, to select at least one of the possible settings of the physical interconnections for the computing elements from the search space, wherein the selected at least one of the possible settings specifies a processing architecture tailored for executing the set of instructions; and providing the selected at least one of the possible settings of the physical interconnections for the computing elements to form the processing architecture tailored for executing the set of instructions. Other embodiments of this aspect include corresponding systems, apparatus, and computer program products recorded on one or more computer storage devices, each configured to perform the actions of the methods.

Further, one or more aspects of the subject matter described in this specification can be embodied in one or more computer systems including: a hardware processor comprising multiple computing elements, interconnection switches among the multiple computing elements, and input-control switches for the multiple computing elements, wherein each computing element in the multiple computing elements is connected to each other computing element in the multiple computing elements through at least one of the interconnection switches, and wherein each computing element in the multiple computing elements is connected to input through at least one of the input-control switches; and an architecture switch unit configured to set the interconnection switches and the input-control switches in the hardware processor according to received settings to reconfigure the multiple computing elements to define an arrangement of logic gates in the hardware processor for executing instructions of one or more computer programs, wherein setting a switch is turning the switch on or off. Other embodiments of this aspect include corresponding methods and computer program products recorded on one or more computer storage devices, each configured to perform the actions of the methods.

Various embodiments of the subject matter described in this specification can be implemented to realize one or more of the following advantages. Unlike static processor architectures in which interconnections between transistors are built in strict order, the techniques of the present disclosure provide the capability of creating a dynamic (metamorphic) processor architecture where respective computing elements of the processor (e.g., in different embodiments comprising transistors or predefined logic gates, or predefined sets of logic gates, or the combination thereof) interconnected with each other and to the input channels via control gates (or switches) can be operated by a computer program via those switches (e.g., in real time or near real time) to take different shapes (optimal architectures) tailored for efficient execution of the received sets of instructions. In other words, each set of instructions (representing one or more computer programs) can be processed by the specifically tailored architecture which can lead to significant improvement in computing productivity of the processor(s). This approach can be applied in a universal (not application-specific) architecture that automatically adapts to any set of instructions (in the form of arithmetic operations, either as originally written or converted thereto) on the clock cycle level in a real-time, where the incoming set of instructions can be analyzed to determine the optimal architecture for each next clock cycle. While the advantage of the dynamic (or self-adapting to each particular set of instructions) processor architecture over the classical static architecture can be well understood from the underlying concepts, the difference between methods and systems disclosed herein and already known reconfigurable processing techniques are now explained in more detail. One or more of at least the following features (and combination(s) thereof) significantly distinguish the subject matter technology from the available reconfigurable integrated circuits of different types (e.g., FPGAs or any other processors with reconfigurable components) in implementations: 1) on-the-fly program analysis of the incoming set of instructions to determine the processing architecture best tailored for execution of the given set of instructions; 2) automatic and simultaneous (same clock cycle) tailored architecture set up and execution of the set of instructions on a clock cycle level—with no architecture upload/switching latency; and/or 3) universality—the subject matter described in this disclosure enables optimized processing of any sets of instructions without application-specific limitations, i.e., can be used in creation of a general-purpose high-performance dynamic architecture processor. In contrast, the applied architectures of known processors with reconfiguration capability are normally a result of a preliminary standard integrated circuit (IC) design process (i.e., they are not programmatically determined in real time); processing of instructions on such an architecture can only be possible after architecture upload or switching between a number of pre-uploaded variants, where both processes entail time costs and make inefficient (if not impossible) reconfiguration with clock cycle frequency. Besides, each architecture after being uploaded to or switched within the reconfigurable processor can not be universally efficient for all possible types of algorithms it may face. Thus, described in the present disclosure provides the concept of a truly dynamic processor that can automatically adapt to assemble an optimal processing architecture based on received instructions and represents an innovative approach aimed to outperform not only the traditional hard-wired (static) architecture processors but also the reconfigurable processing units of the existing computing resources.

The details of the embodiments of the subject matter described in this specification are set forth in the accompanying drawings and the description below. Other features, aspects, and advantages of the invention will also become apparent from the description, the drawings, and the claims.

BRIEF DESCRIPTION OF THE DRAWINGS

Like reference numbers and designations in the various drawings indicate like elements.

DETAILED DESCRIPTION

Figure 1:
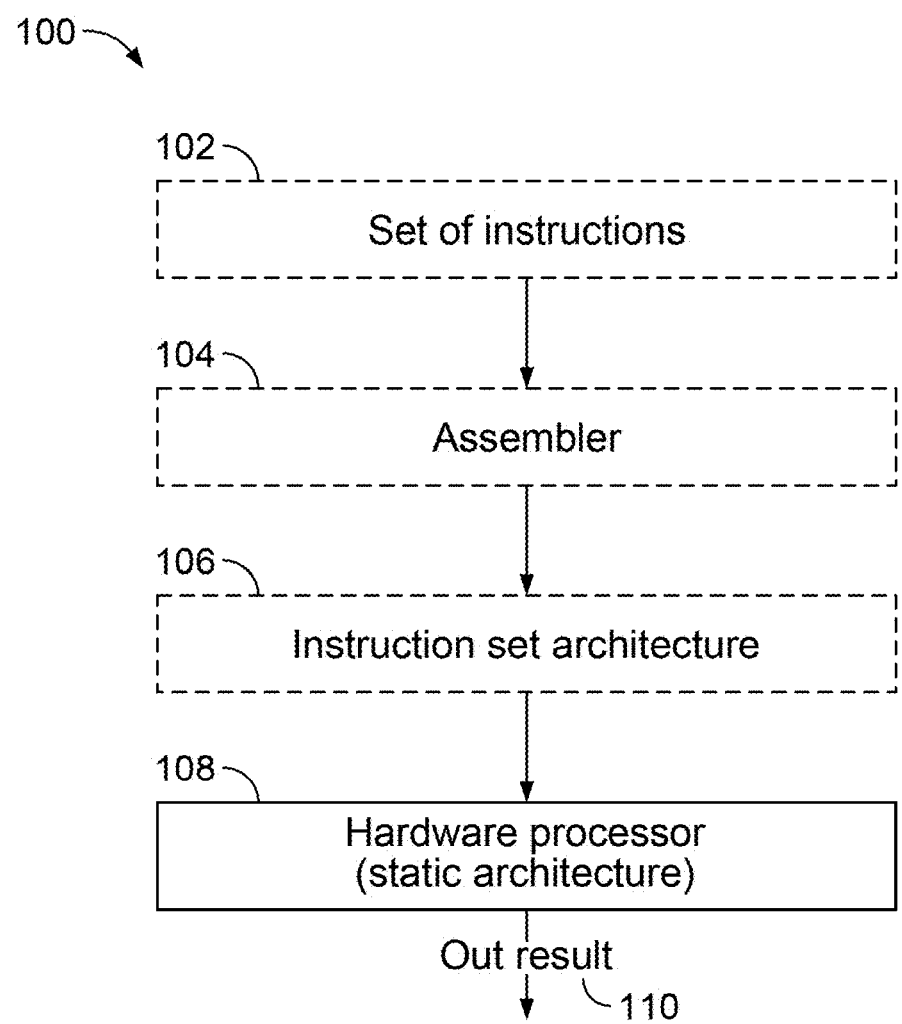
FIG. 1 is a block diagram showing a simplified process flow of algorithm (set of instructions) execution by a traditional static architecture.

The present disclosure describes techniques for implementing a dynamic processor architecture for use in computing systems, such as in computers. The techniques include a method and a system of (automatic) transformation of a processor architecture to configurations specifically tailored to each received set of instructions so as to make more efficient use of its computing resources (or computing elements) and increase the processing capacity. In this case, the reconfiguration of the processor architecture includes the reorganization of interconnections for the computing elements in the best possible way to facilitate their optimal load for each clock cycle, where "best" means that the reconfiguration seeks to minimize the number of clock cycles that are needed to process a given set of instructions. Moreover, each "computing element" of the computing elements that are efficiently used can be a single transistor (or its equivalent in a given processor), a predefined basic logic gate (of any suitable type), a predefined logic gate set (of any suitable composition and structure, e.g., a complex logic gate, adder, bitwise unit, arithmetic unit, core, etc.), or a combination thereof assembled into one interconnected structure as built at the time of processor design and production.

The reconfigurations are performed in order to minimize the number of clock cycles for processing of one or more computer programs (altogether defined as a set of instructions within this disclosure; a set of instructions is a portion of, or all of, one or more computer programs, and instructions within a set of instructions can be independent of and/or interdependent on other instructions within the set of instructions, whether in the same or different computer programs), and (consequently) increase the execution speed of the respective set of instructions. In particular, the execution performance and the processor capacity are increased, for example, through the more efficient use of the available computing elements. This can be achieved by applying tailored architectures to each of the clock cycles required for executing a given set of instructions, where the tailored architecture is aimed to accommodate a maximum number of instructions per one clock cycle thus minimizing the total number of cycles for full execution of the set of instructions and increasing the overall execution speed.

To simplify the description of the present disclosure, computer algorithms can be understood as consisting solely of arithmetic operations or expressed in arithmetic terms (e.g., in the form of a linear arithmetic formula). The set of instructions can either be translated to arithmetic form using the systems and/or techniques described in U.S. Pat. No. 11,029,920 B1, or the program can be initially written this way. Execution can then occur solely through an arithmetic unit (AU) (e.g., using adders and bitwise operation units only) of the processor without the involvement, for example, of a digital comparator, zero state flags or any other units/elements traditionally responsible for the processing of conditional statements.

Transistors and logic gates are the building blocks of any digital circuit (e.g., an adder) and as such represent the fundamental elements of arithmetic units of a processor. Since the systems and/or techniques of the subject disclosure are devoted to optimization of computing resources, the present description will focus on computing elements of the processor and skip other necessary units forming the core (e.g., registers, memory, control units, etc.) as not relevant for the subject. As such, for further simplification, a processor (or core) can be viewed as just a respective number of interconnected adders and bitwise operation units.

In this way, the processor (or core of the processor) can be considered as a set of computing elements interconnected with each other in a way to be able to perform any type of arithmetic calculations in a number of clock cycles that correspond to the declared processor (core) capacity (e.g., x-bit in one clock cycle). For example, each static core or arithmetic unit of a 64-bit processor typically contains 64 1-bit adders (and normally a bitwise operation unit), which together are capable of performing one arithmetic computation of maximum 64-bit values in a single clock cycle. In case values used in the computation are larger than the declared static processor capacity, then more clock cycles are required to perform the full operation by the particular core. However, for arithmetic computations involving smaller values in one clock cycle (e.g., 1-to-63-bit values), 1-63 adders of the total 64 are sufficient to do the job, without the need to involve remaining resources in execution. Typically, in traditional processors, in execution of such smaller values, respective excess adders do not perform any useful computations (e.g., are simply loaded with zeros), but are still involved in the processing. Similar inefficiencies, when a processor capacity is not fully loaded with real computations, can happen at the level of almost any portion of instructions allocated for each of the clock cycles, and serves as an example of disadvantage of the static processor architecture versus the techniques disclosed herein.

The reason for such deficiencies is that architectures of modern processors represent static (or "frozen") structures. The static structures include a certain number of interconnected predefined logic gates forming a certain number of adders (and normally a bitwise operation unit) in each of the x-bit (normally 32 or 64-bit) cores, where the number of adders in each of the cores firmly corresponds to the declared x-bit processor capacity. These architectures lack flexibility in most cases, as such cores' resources are either not fully-loaded for a particular clock cycle (e.g., in case of small and simple instructions) or have insufficient capacity to accommodate full calculation in a single clock cycle (e.g., when the set of instructions is complex or involve larger values). Some of the examples of such inefficiencies are described below.

In a first example, a traditional static processor architecture executes multiple independent programs with small value computations (e.g., 10-bit), in parallel, by relatively large (e.g., 64-bit) static cores. A regular 64-bit core has 64 adders, however, values for some particular computations are too small to exploit all available adders in this example. Therefore, some adders in the cores are set up to compute zeroes, while other adders perform real computations. This results in a situation where cores that can execute tasks in a certain clock cycle are not fully loaded in terms of their real capacity (e.g., in terms of all available computing elements), while the next portions of instructions wait for their turn in the second, third, and further cycles, etc. Idle computing resources of the cores (adders here) under this scenario could have potentially been engaged in the execution of the next instructions in the queue but this is not possible with static architectures.

In a second example of static processor deficiencies, instructions with large values (e.g., 80-bit or more) are typically executed by relatively small static cores (e.g., 32- or 64-bit). Normally, this situation is effectively resolved with parallelization of some operation types (e.g., operations of addition and multiplication of large values can be executed in parts on several cores in parallel). However, operations like division cannot be parallelized between several cores and in case the core capacity is too small to accommodate a complete division instruction in one clock cycle, the remaining instruction part waits for the first clock calculation to complete and then is executed in a second clock cycle only.

In a third example, the standard processors are capable of processing arithmetic algorithms by distributing the set of independent instructions between their several cores (parallelization) that each perform only one independent calculation in a single clock cycle (if capacity allows) or sometimes in more than one clock cycle (if capacity is insufficient). But modern cores are typically unable to perform more than one computation in a single cycle, which is a shortcoming that is overcome by the systems and/or techniques of the present disclosure, where an optimal architecture can include at least a circuit with multiple inputs and outputs configured to perform multiple operations in a single clock cycle.

The above examples demonstrate that in a predetermined static architecture it is difficult if not impossible to exploit processor capacity efficiently by utilizing the maximum potential of all computing resources that are available in a given processor. This problem is resolved by the technologies described herein.

To further explain the techniques of the present disclosure, the fundamental logic behind it is now explained. First, it is acknowledged that one of the best options to achieve the most optimal execution parameters for a certain algorithm (or certain set of instructions) is to create an application-specific integrated circuit (ASIC) or reconfigure the architecture of the field-programmable gate array (FPGA) to tailor it to that particular task(s). Second, the processor (or its computing part in particular) can be understood as a combination of interconnected computing elements (e.g., from transistors to logic gate sets, as defined above) serving as building materials or blocks for any (form of) processing architecture and not just integrated into one permanent structure. Third, any set of instructions can be expressed in the form of a linear arithmetic formula(s) and can be analyzed as set(s) of arithmetic operations to find the best variants and order of operations, define a number of clock cycles required for full executions and order of operations in each of the clock cycles, which enables identification of the processor architecture best tailored to execute the subject task of the set of instructions. Given these three aspects, it can be concluded that the most efficient way for processing a certain set of instructions can be to assemble (out of all available computing elements of the processor) in a dynamic way an optimal architecture best tailored for execution of each received set of instructions. And unlike the ASIC or FPGA that also represent examples of static architectures (though tailored to specific tasks) the dynamic (or metamorphic) processing techniques can allow reconfiguration of the processor architecture on a clock cycle level (i.e., almost in real time) based on the requirements of the received set of instructions.

The systems and/or techniques described herein include a solution that transforms, for a given set of instructions, all available computing elements of the processor into an optimal configuration for each clock cycle. This transformation can lead to accelerated execution of instructions by forming a processing architecture capable to execute maximum instructions per each clock cycle thus minimizing the total number of clock cycles used and accelerating overall execution speed as a result. On the clock cycle level, the present systems and/or techniques can allow maximization of the number of operations per (each) one core per clock cycle (e.g., when an optimal architecture can include at least one core capable to perform more than one operation in a single clock cycle, i.e., represent a complex circuit with multiple inputs and outputs), one-or-multi-core structuring of computing elements to accommodate execution of maximum possible instructions (from the set) per each clock cycle and parallelization of division operations (e.g., where the queue in the earlier example can be shortened or even eliminated). As the result, the present systems and/or techniques can make possible the execution of the set of instructions in fewer clock cycles as compared to the static architecture of the same capacity (in terms of computing resources/elements). These improvements provided by the dynamic processing architecture can overcome limitations of the static architecture, where the (only one) architecture cannot be efficient for execution of all types of possible tasks as its structure is not best tailored to each of the received sets of instructions.

As an example, in FIG. 1 a simplified static architecture process flow 100 involves a hardware processor 108 that employs a static architecture, which typically processes a received set of instructions in a consistent, but static, way, i.e., without consideration of the specifics and complexity of the instructions. In the static architecture process flow 100, a set of instructions 102, which can be from one or more independent or dependent programs, can be received by an assembler 104, which can transform (e.g., assemble) high-level language of the set of instructions 102 into an assembly language. In the static architecture process flow 100, the assembly code is then received in an instruction set architecture 106, which can encode the assembly language into machine code and send it directly to the hardware processor 108 (with static architecture) for execution. In this static architecture process flow 100, and specifically in the hardware processor 108, interconnections between transistors and logic gates of the hardware processor 108 are built in a strict and static order to form a corresponding number of cores of fixed shape and structure. As such, an output result 110 is generated by the hardware processor 108 without any advantages of dynamic architecture processing (e.g., for each clock cycle forming an optimal architecture tailored for the received instructions depending on their specifics and complexity).

Figure 2:
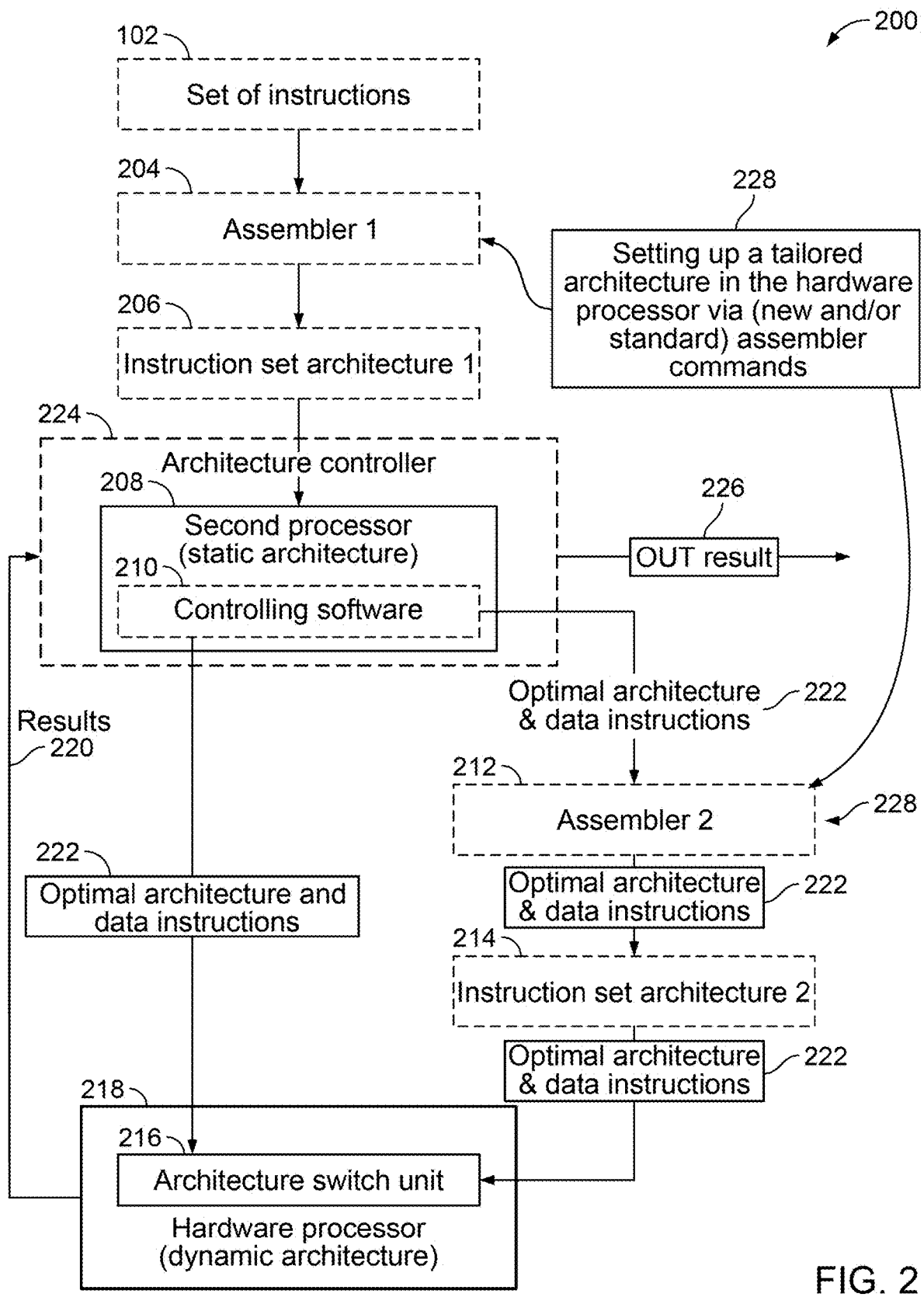
FIG. 2 is a block diagram showing a high-level process flow of algorithm (set of instructions) execution by a dynamic processor architecture.

As shown in FIG. 2, a dynamic architecture process flow 200 can be used to transform, for a given set of instructions, all available computing elements of a hardware processor 218 (which employs a dynamic architecture) into an optimal configuration for each of the required clock cycles. As is the case in the static architecture process flow 100 of FIG. 1, the same set of instructions 102 can be received by a first assembler 204, which can transform (e.g., assemble) high-level language of the set of instructions 102 into assembly language which is then translated by a first instruction set architecture 206 into machine-readable code and provided for execution. However, in the dynamic architecture process flow 200 of FIG. 2, the machine-readable code is then provided to a second processor 208 (which employs a static architecture) that has a main function (as opposed to the hardware processor 108) of not just simply executing the set of instructions 102 but rather to run controlling software 210 (together with the second processor 208 hereinafter referred to as an architecture controller 224) to analyze the received set of instructions 102, as a set of arithmetic instructions, to determine the optimal processor architecture that best fits the received set of instructions 102. Based on the analysis performed, the architecture controller 224 can provide instructions 222 (which along with the optimal architecture instructions can also include data values from the set of instructions 102 to be executed by that particular optimal architecture) to an architecture switch unit 216—a unit configured to dynamically change architecture settings (i.e., perform a reorganization of interconnections for the computing elements) of the hardware processor 218 in accordance with the optimal architecture instructions from the architecture controller 224. As a result, interconnections between computing elements of the hardware processor 218 can be modified in dynamic configuration(s) to form specific architecture(s), best tailored for the received set of instructions 102 so that the hardware processor 218 can perform efficient execution of the received set of instructions 102. This provides an improvement in terms of processing efficiency over the hardware processor 108 where the architecture configuration is static and does not change to best fit the particular set of instructions received for execution. Moreover, although referred to as controlling software 210, it will be appreciated that the controlling operations described in this application can be implemented using software, firmware, embedded code, and/or be hard coded into a control unit.

In order to implement optimizations described herein, the systems and/or techniques of the present disclosure can employ the architecture controller 224 and the architecture switch unit 216 as now described. The architecture controller 224 can include the controlling software 210 that is run on the second processor 208. The architecture controller 224 can be specifically designed to analyze the set of instructions 102 submitted for execution including: 1) partitioning the computer algorithm into variants of arithmetic operations (e.g., using Reverse Polish Notation or any other notation suitable for this task), 2) sorting values of elements in variants of arithmetic operations (e.g., in terms of x-bit values); 3) determining, what optimal architecture (including variants of operations to be used, a number of clock cycles required, execution order of the instructions, which instructions to be executed in which of the clock cycles, etc.) needs to be generated to process the subject set of instructions and provide the respective instructions to the architecture switch unit 216 to turn the optimal architecture on.

The architecture switch unit 216 can be a unit placed inside or outside of the hardware processor 218, depending on a realization that is needed. The architecture switch unit 216 can control (e.g., on a physical level) interconnections between all computing elements of the hardware processor 218 and inputs to all its computing elements through control switches in such a way that the architecture switch unit 216 can turn on an optimal architecture for the set of instructions 102 each time the respective instructions are received from the architecture controller 224.

The specific manner in which the architecture controller 224 communicates the instructions 222 to the hardware processor 218 (or its architecture switch unit 216) can vary by implementation. Two possible ways are shown in FIG. 2. When the second processor 208 has hard integration with the hardware processor 218 (e.g., realized as system-on-chip or SOC) the instructions 222 (for the optimal architecture, and optionally, data) can be provided to the architecture switch 216 of the hardware processor 218 directly via system bus lines. In other cases, where there is no hard (bus) connection of the second processor 208 to the hardware processor 218, the instructions 222 can be communicated by the architecture controller 224 to the architecture switch unit 216 of the hardware processor 218 via a second assembler 212, which can assemble instances of the optimal architecture (and data) instructions and forward them to a second instruction set architecture 214 for encoding to machine-readable format thus enabling the (optimal) architecture set up by the architecture switch unit 216 and efficient execution of the set of instructions 102 by the hardware processor 218.

The set of instructions 102 is to be analyzed by the architecture controller 224 as a set of arithmetic operations. In implementations where the second processor 208 and the (metamorphic) hardware processor 218 are not integrated (e.g., connected via a communication bus), this suggests that both the first assembler 204 and the first instruction set architecture 206 can be standard or modified depending on where the conversion to arithmetic (if any) will take place. In cases, where the set of instructions 102 is initially written as arithmetic operations or was converted to arithmetic equivalent before being received by the system described in FIG. 2, both the first assembler 204 and the first instruction set architecture 206 can be optimized by excluding commands responsible for processing of conditional statements. Where the architecture controller 224 (e.g., the controlling software 210 run on the second processor 208) is itself configured to interpret the set of instructions 102 as a set of arithmetic operations, the first assembler 204 and the first instruction set architecture 206 can be standard. The second assembler 212 and the second instruction set architecture 214 can be modified such that new commands supporting architecture switch unit 216 operation can be added.

The system described in the present disclosure can also be configured so that that the assembler (either the first assembler 204 or the second assembler 212 or both) can be used (e.g., by program developers or chip architecture designers) as a tool to reprogram the dynamic architecture of the hardware processor 218 to form 228 a specific architecture in accordance with the respective instructions (e.g., using the FPGA approach). For example, this can be done by introducing one or more assembler commands, e.g., a Switch Settings (SS) command, which can enable manual setting of the tailored architecture in the hardware processor 218 by calling this command followed by a matrix with coordinates of respective switches to be opened or closed in the architecture switch unit 216 of the hardware processor 218. An example of such an instruction can be the following, [SS (x1, y1, z1); (x2, y2, z2); . . . ; (xi, yi, zi)], where x is a switch coordinate column number, y is a switch coordinate row number and z is a switch status being either 0 (switch is off) or 1 (switch is on). By providing respective assembler (architecture switch unit setting) instructions to the architecture switch unit 216 of the hardware processor 218, it can be possible to bypass the (automatic) optimal architecture set up techniques described in the present disclosure and (manually) set "one of the possible settings of the physical interconnections for the computing elements" to be applied as a tailored (static) architecture for processing of further program instructions until cancellation (e.g., by another assembler command [SS default] returning the dynamic processor architecture to its default automatic mode).

Another possibility of setting up a tailored architecture 228 in the (dynamic) hardware processor by way of manual interventions via the first assembler 204 code is to configure the system described in the present disclosure so that it can accept special assembler instructions for opening and closing the (forced) "architecture set up" mode (e.g., FIONA1—instruction to open the mode and FIONA0 to close the forced set up mode). After opening this mode, the standard assembler commands can be used to denote the set of instructions (e.g., a program algorithm), which optimal architecture (as determined by the architecture controller 224 in accordance with the techniques of the present disclosure) will be established by the architecture switch unit 216 and used as the tailored (static) architecture of the hardware processor 218 for processing of further tasks until the respective (forced) "architecture set up" mode is closed. The following set of instructions can be used: [FIONA1 (ADD x10, y14, z08); (DIF x15, y1, z03); . . . (XXX xi, yi, zi, . . . ni)], where ADD, DIF are examples of standard assembler commands and x, y, z, . . . n are values and their locations in memory registers and [FIONA0] is the command switching off the (forced) "architecture set up" mode. This approach can be useful to enable the developer to switch on and off his own "one of the possible settings of the physical interconnections for the computing elements" in the (dynamic) hardware processor using the standard set of assembler commands. The effect achieved by the described techniques looks similar to programming the in-house developed architecture on FPGA or creation of an ASIC with the difference being that this capability of reprogramming the processor architecture is embedded in the metamorphic processor configuration, e.g., along with its primary functionality, and the (forced) "architecture set up" mode can be switched on and off (e.g., in favor of the dynamic architecture) anytime by the set of additional assembler commands.

The optimal architecture best tailored for the set of instructions 102 can be understood as one optimal architecture in a case where complete execution of the set of instructions 102 involves one clock cycle only, or a set of optimal architectures (normally one optimal architecture per clock cycle) if more than one clock cycle is required by the hardware processor 218 to execute the set of instructions 102. In some cases, optimal architectures for two or more clock cycles can be identical if instructions allocated to these clock cycles happen to be the same or similar (e.g., in terms of type/order of operations, variables' values, etc.). In other cases, where instructions differ from cycle to cycle, the optimal architectures for two or more clock cycles can be different. The number of described architecture transformations for execution of a set of instructions is not limited. Each new clock cycle required for full execution of the set of instructions 102 can have a new optimal architecture. The number of clock cycles can depend on the capacity of the hardware processor (e.g., number of computing elements) and the complexity of the set of instructions 102. As an example, the goal can be to optimize the execution speed by maximizing the number of instructions captured for execution per each clock cycle, thus minimizing the number of clock cycles to process the full set of instructions.

The optimal architecture related to any of the clock cycles needed for processing the set of instructions 102 can be applied to the hardware processor to form one core or multiple cores of any size and complexity (depending on the needs of the received set of instructions 102) limited only by the number of available computing elements in the hardware processor 218. In any case, the optimal architecture might not utilize all available resources, and remaining, unused computing elements can still be present in the hardware processor 218.

The instructions 222 (with optimal architecture and data) communicated (for each clock cycle) by the architecture controller 224 to the architecture switch unit 216 of the hardware processor 218 can look like program code containing two matrices—a first matrix in the order of instructions 222 can represent the full setting of individual switches (complete configuration of the architecture switch unit for the particular clock cycle) tailored for processing the received set of instructions, which can be followed by a second matrix containing (the set of instructions 102) values for computations mapped to certain input gates/switches of the optimal architecture as opened/turned on by the first matrix. Execution of the instructions 222 (e.g., expressed in the form described above) by the hardware processor 218 can lead to a twofold instant result, namely, forming the optimal architecture in the hardware processor 218 and simultaneous execution of the set of instructions by this optimal architecture, both in the same clock cycle.

In some implementations, a determination can be made whether the effects of applying the optimal architecture to the set of instruction and the subsequent benefits in execution speed outweigh the costs incurred by the architecture controller 224 (e.g., including the time spent on analysis of instructions, reconfiguration of the hardware processor 218 and the exchange of instructions). The determination can include deciding whether the execution speed will benefit from the instruction analysis and reconfiguration of the hardware processor. For complex calculations/algorithms, a decision can be made to simply execute the instructions using standard processing, thus avoiding the costs associated with analysis and subsequent architecture transformation for use in a dynamic architecture. In this case, the time required for an analysis and subsequent architecture transformation may not be justified by the complexity of the set of instructions. It can also be the case that such simple algorithms can be executed on the static architecture of the second processor 208 without any architecture transformation and use of the hardware processor 218. This can occur, for example, if the execution can be done more efficiently on the static architecture of the second processor 208, without the dynamic processing that is the subject of this disclosure. Based on these considerations, one or more ranges of algorithm complexity can be defined such that algorithms having certain complexities are always executed using a static architecture (e.g., of the second processor 208) or by an optimal architecture (e.g., of the hardware processor 218), depending on the complexity. In some implementations, algorithm complexity scores can be determined and used in deciding how the algorithm is to be executed, or some preprocessing evaluation can be performed by the controlling software before the analysis to find the optimal architecture starts. Also, the second processor 208 can possibly share execution with the hardware processor 218 when the latter is dynamically configured and loaded with a queue of instructions from the architecture controller 224, while the second processor 208 have spare capacity to execute some of the instructions to add to overall productivity of the system.

The architecture controller 224 and more specifically the controlling software 210 can use a set of pre-determined rules to represent and implement its function by using, for example, an optimization or path-finding algorithm. For example, Dijkstra's algorithm can be used to find the shortest path(s) between nodes in a weighted graph, e.g., to determine a minimum number of switches to be turned on to form the optimal architecture. The architecture controller 224 can also be guided by a trained artificial intelligence (AI) model (e.g., using a generative-type or any other suitable model) to determine the optimal architecture for execution of a set of instructions 102. In some implementations, both an optimization (e.g., path finding) algorithm and a trained AI model (or any other suitable machine learning model) can be applied in the controlling software 210.

In some realizations, an AI model can be used in reinforcement learning based on continuous training, so as to be capable of producing the optimal architecture based on the input data, e.g., in the form of arithmetic formula(s). Reinforcement learning is a subfield of machine learning that deals with training models to make decisions based on feedback from an environment. In the case of the present disclosure, the environment can include the problem of finding the optimal architecture, and the model can learn to make decisions based on feedback from the environment in the form of rewards or penalties. To use reinforcement learning for finding the optimal architecture, it is necessary to define a state space, action space, and reward function for the problem. The state space can include all the relevant information about the current situation, such as the necessary details of the given computer program or a series of independent programs (i.e., the set of instructions 102) and other relevant data. The action space can include all the possible variants of architectures that can be chosen in the current state to execute the set of instructions. The reward function can specify the objective, such as minimizing the number of switches to be turned on to form the optimal architecture. After defining these components, a reinforcement learning algorithm such as Q-learning or deep reinforcement learning can be used to train the model. The model can learn to make decisions based on the current state and the action space, and can receive feedback in the form of rewards or penalties based on how well its decisions align with the objective or goal of the problem. Training a reinforcement learning model can be computationally expensive and time-consuming, especially for complex problems with large state and action spaces. However, if implemented correctly, a reinforcement learning model has the potential to out-perform traditional optimization (e.g., path finding) algorithms by finding more efficient and effective solutions to the optimal architecture determination problem over time.

Referring again to FIG. 2 and the dynamic architecture process flow 200, the second processor 208 having a pre-defined processing architecture can be understood as being always coupled with some controlling software 210. Both the second processor 208 and the controlling software 210 can be in the same computer with the hardware processor 218 or in one or more different computers. For example, the second processor 208 can be outsourced to third-party cloud-based program execution services (e.g., Amazon Web Services (AWS), available from Amazon Technologies, Inc. of Seattle, Washington, or IBM clouds, available from International Business Machines Corporation of Armonk, New York). In some implementations, the controlling software 210 can be installed on the same computer with a second processor 208 or on a third computer. The controlling software 210 can communicate with the second processor 208 (e.g., for analyzing the set of instructions and for determining the optimal architecture), with the architecture switch unit 216 (for setting an optimal architecture) and the hardware processor 218 (for exchange of data and results)

over the Internet or other internetwork, or one or more computer networks. A key point is that the controlling software 210 cannot run without some physical processor somewhere, and the second processor 208 that plays a role of that physical processor can be local or remote. For example, a second processor 208 (e.g., in the form of an application-specific integrated circuit (ASIC) or a central processing unit (CPU)) can be coupled with the (metamorphic) hardware processor 218 over a communication bus (e.g., integrated in one system-on-chip), or operate remotely, e.g., as one or more processors in AWS or IBM clouds that run the controlling software 210.

In FIGS. 3A-3D, the capacity of the standard arithmetic logic unit (ALU) (as an example of a traditional static architecture) is compared with three modified adders (as examples of optimal architectures for particular operations) each comprised of fewer computing elements than in the standard ALU but capable to perform the same or even more complex and/or larger-value computations in fewer clock cycles. The purpose of FIGS. 3A-3D is to show the basic concept of efficiency of the dynamic architecture approach versus static architectures on a clock cycle level. In this particular comparison, computing elements in the form of logic gates are addressed, but the general principles addressed are applicable at the level of sets of logic gates, as well as at the level of transistors, within a metamorphic hardware processor.

Figure 3A:
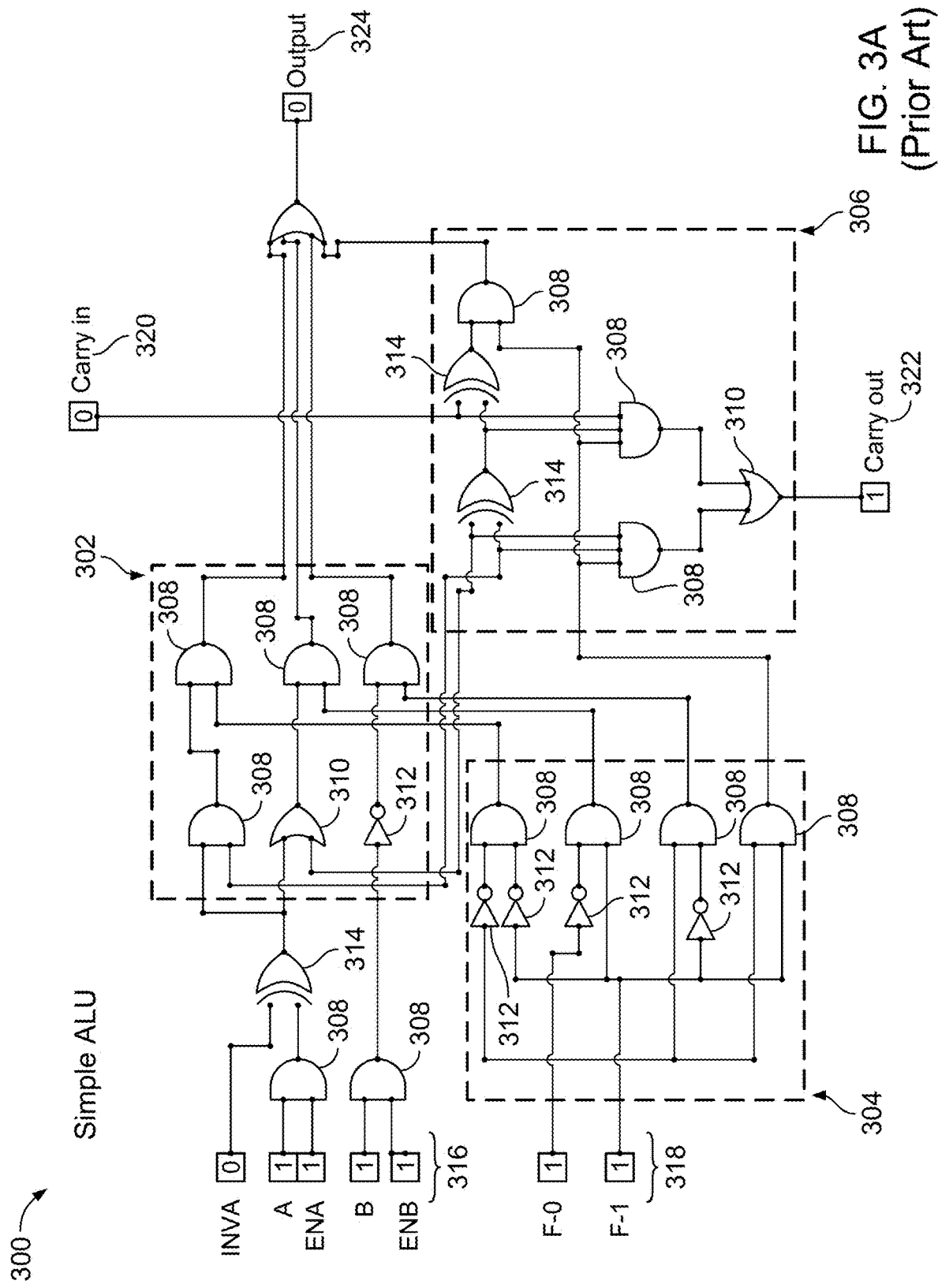
FIGS. 3A-3D are logic diagrams collectively showing standard arithmetic logic unit (as an example of static architecture) and variations of circuits best tailored to perform certain operations (as an example of dynamic architectures using fewer computing resources and less execution time than static architecture to produce same or even better result).

In FIG. 3A a standard one-bit arithmetic logic unit (ALU) 300 is shown. The ALU is implemented by basic AND gates 308, basic OR gates 310, basic NOT gates 312 and complex XOR gates 314. The circuit (if expanded to the level of basic logic gates) ultimately consists of 33 basic logic gates (19 AND, 8 NOT, 6 OR) and is capable to perform (A+B) operation in one clock cycle, (A+B+C) operation in 2 clock cycles and (A+B+C+D) operation in 3 clock cycles, where A, B, C, D can be 1-bit variables only. Despite the ALU 300 circuit including a bitwise operation unit 302, an encoder 304 and an adder 306, only the adder 306 (consisting of 12 basic logic gates) is used in processing of the above-mentioned arithmetic operations while computing elements of both the bitwise operation unit 302 and the encoder 304 (21 basic logic gates in total) remain idle. Standard ALU 300 receives inputs 316 and 318, and a carry in 320. Outputs of the ALU include a carry out 322 and an output 324.

Figure 3B:
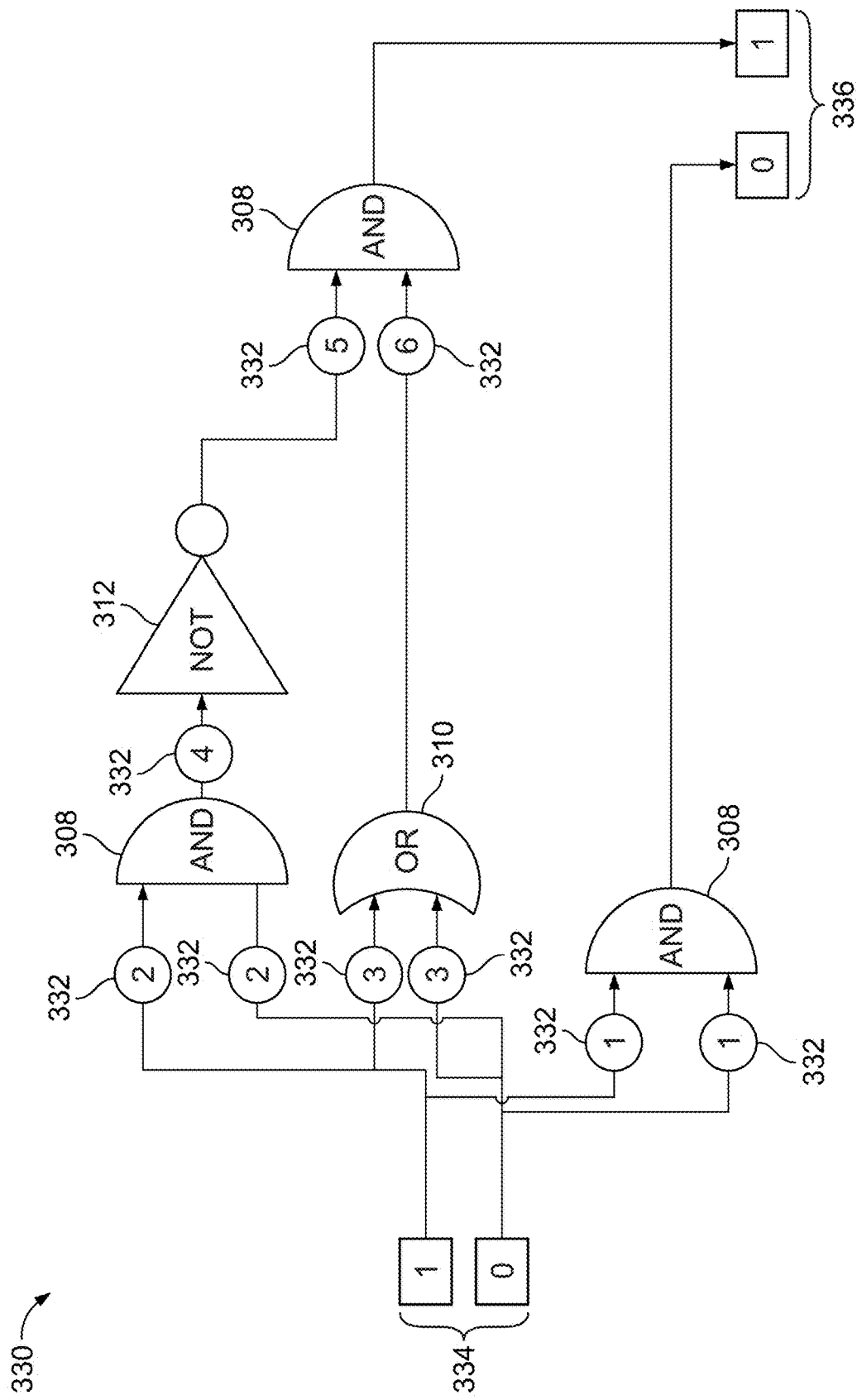

As shown in FIG. 3B, a modified adder 330 is also implemented by logic gates. The modified adder 330 is an improvement over the standard one-bit ALU 300 as it represents a combination of only 5 basic logic gates (consisting of basic AND gates 308, basic OR gate 310 and basic NOT gate 312—the same as in ALU 300) but is still capable to perform (A+B) operation in one clock cycle, where A and B are 1-bit variables. The modified adder 330 receives inputs 334 and produces output values 336. The items 332 (from 1 to 6 in circles) indicate activation of interconnections for the computing elements for (A+B) operation (these items will further be used in demonstration of turning on an optimal architecture for this particular operation on the architecture switch unit level in FIG. 4B and are shown in FIG. 3 just for collation purposes). To conclude, the modified adder 330 demonstrates the variant of an optimal architecture tailored for (A+B) operation (where A and B are 1-bit variables) and composed of fewer computing elements than was used in the standard ALU 300 (or even in the adder 306 constituting a part of ALU 300) for the same operation.

Figure 3C:
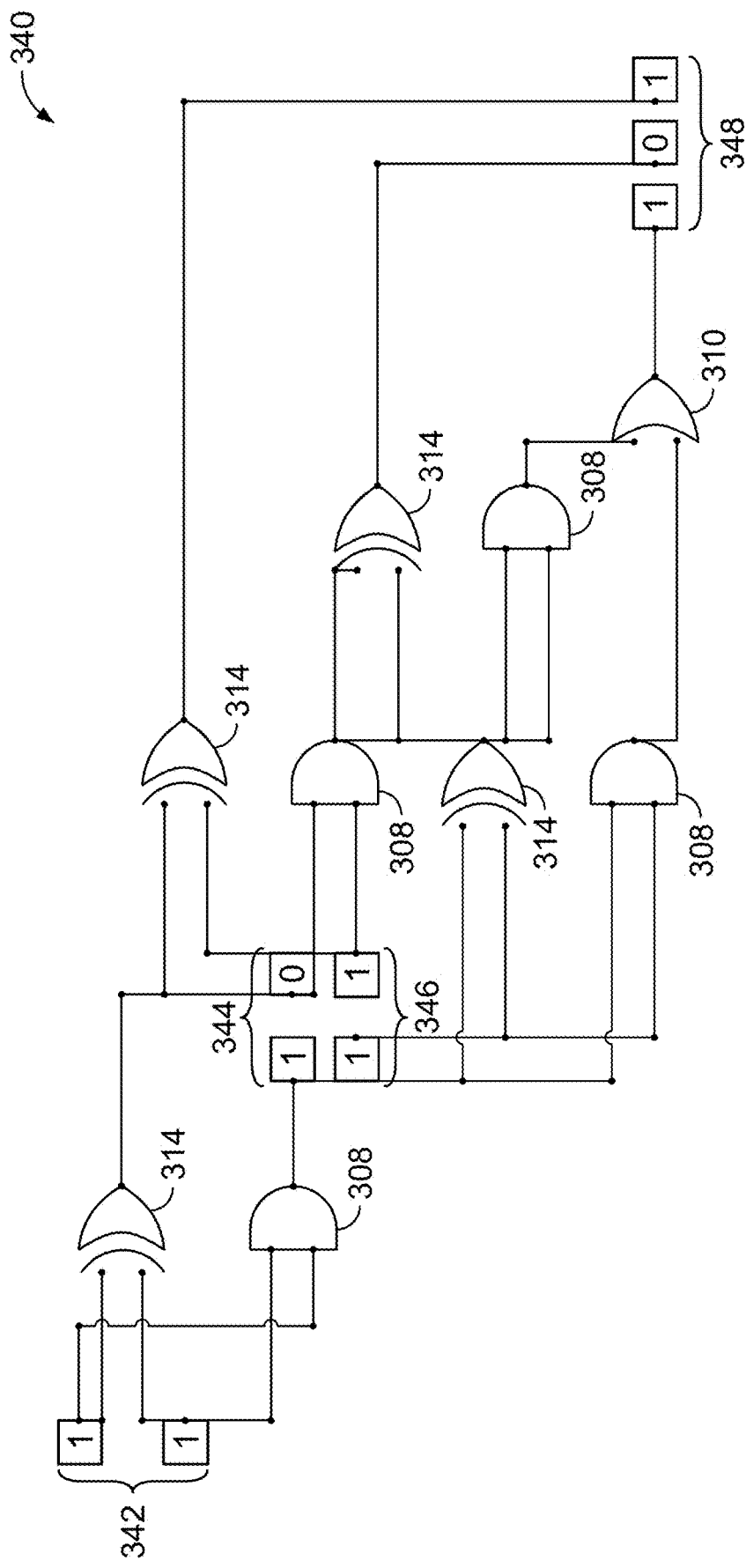

As shown in FIG. 3C, a modified adder 340 is also implemented by logic gates. The modified adder 340 is an improvement over the standard one-bit ALU 300 as it represents a combination of the same basic AND gates 308, basic OR gate 310 and complex XOR gates 314 (21 basic logic gates in total) but now is capable to execute (A+B)+C) instruction in one clock cycle, where A and B are 1-bit variables but result of (A+B) operation as well C variable can be 2-bit values. The modified adder 340 receives inputs 342, intermediate results/inputs 344, 346 and produces output values 348. Thus, the modified adder 340 displays the variant of an optimal architecture for ((A+B)+C) operation, which not only uses fewer computing elements but now performs the same operation with larger values and in less clock cycles than the standard ALU 300.

Figure 3D:
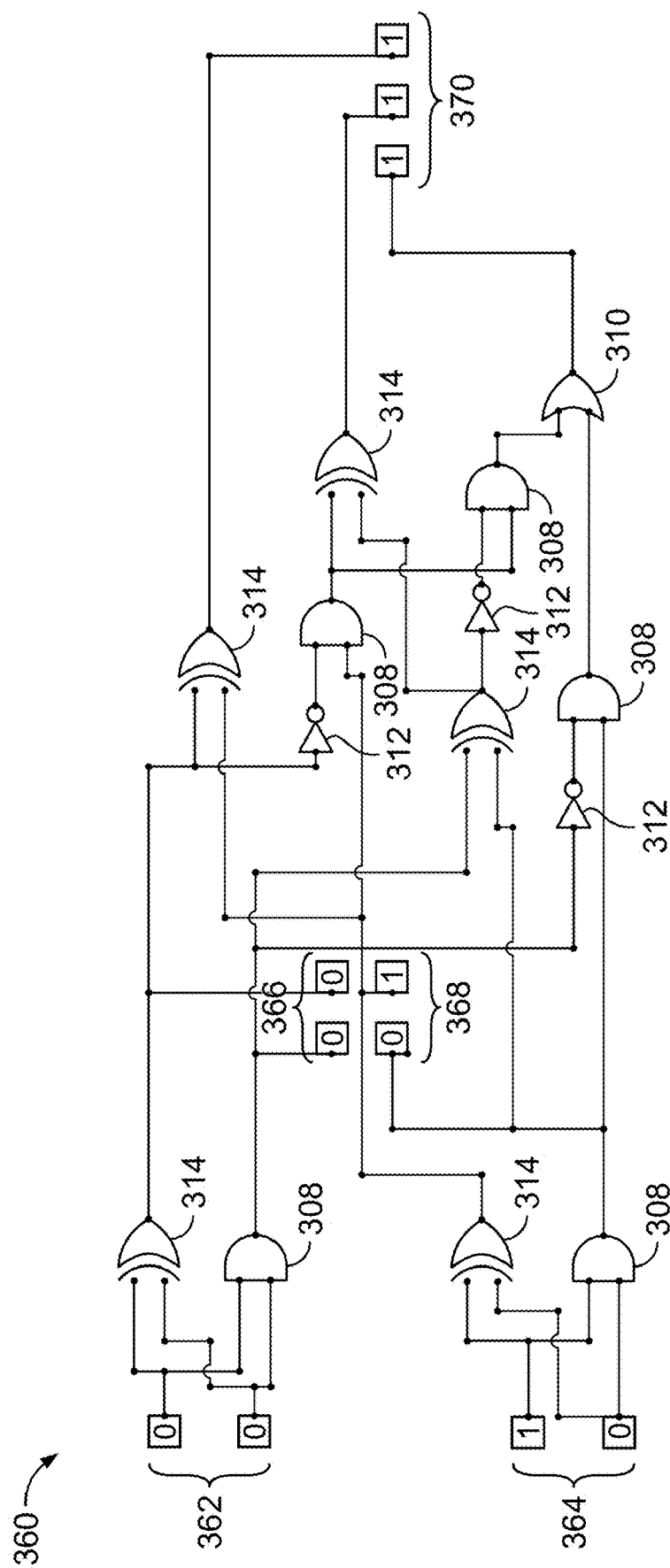

Similarly, in FIG. 3D a modified adder 360 is also implemented by logic gates. The modified adder 360 is an improvement over the standard one-bit ALU 300 as it represents a combination of the same basic AND gates 308, basic OR gate 310, basic NOT gates 312 and complex XOR gates 314 (29 basic logic gates in total) but now is capable to perform ((A+B)-(C+D)) operation in one clock cycle, where A, B, C and D are 1-bit variables but results of (A+B) and (C+D) operations can be 2-bit values. The modified adder 360 receives inputs 362, 364 and intermediate results/inputs 366, 368 and produces output values 370. The modified adder 360 demonstrates the variant of an optimal architecture for ((A+B)-(C+D)) operation and not only uses fewer computing elements but now executes even bigger set of instructions comprising larger values in less clock cycles than the standard ALU 300.

As shown in FIGS. 3A-3D the concept of dynamically tailoring architectures (e.g., on the clock cycle level) to fit specific sets of instructions has clear advantages over the static architecture approach in terms of resources used (and consequently a physical size of the circuit) and resulting processor capacity. The following description explains how the dynamic architecture processor can be built and various implementation details that enable the turning on or reconfiguring optimal architectures on a physical level.

Figure 4A:
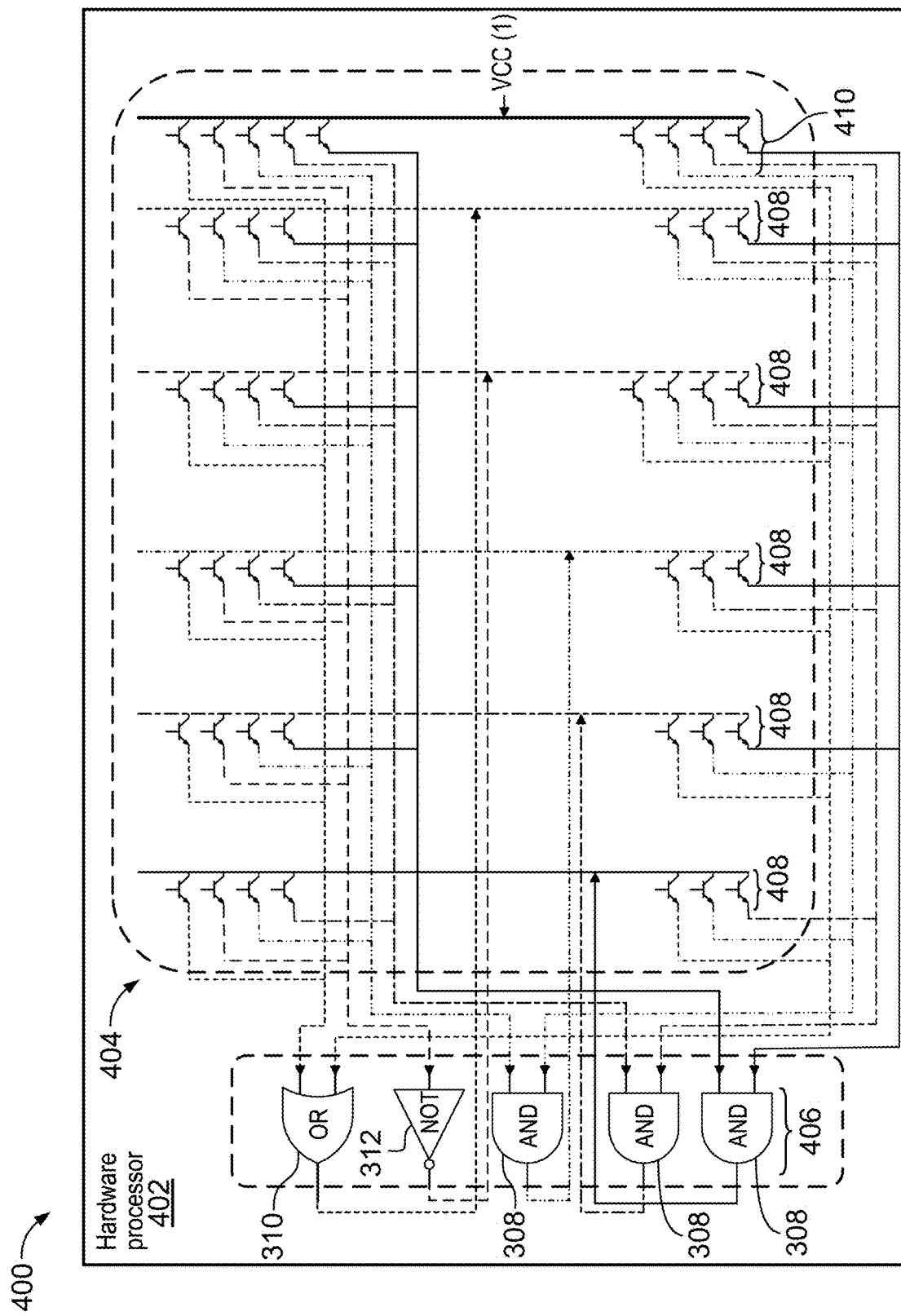
FIGS. 4A-4C are logic diagrams collectively showing an example of dynamic architecture of the hardware processor as well as various levels of details of its architecture switch unit configured to turn on the optimal architecture tailored to perform (A+B) operation (described in detail in FIG. 3B).

As outlined above, the hardware processor 218 can include a certain number of computing elements interconnected in a specific manner so that connections for such computing elements (as well as inputs to the computing elements) are controlled by switches operated by an architecture switch unit 216. The architecture switch unit 216 in some implementations can be an integral part of the hardware processor 218 and can form the optimal architecture for each set of instructions 102 based on (optimal architecture) instructions from the controlling software 210 run on a second processor 208. In FIG. 4A, a schematic 400 of an example of a dynamic architecture hardware processor 402 (or a hardware processor 218) includes computing elements represented by logic gates 406 and a high-level view of an architecture switch unit 404 to operate those logic gates. In this example, an architecture switch unit 404 can be used to turn on (or off) interconnection switches 408 (responsible for activating interconnections among logic gates) and input-control switches 410 (responsible for activating inputs to logic gates) so that logic gates 406 can be assembled into a structure, e.g., equivalent to circuit 330 from FIG. 3B, by activating some of the interconnection switches 408 and input-control switches 410 on the level of the architecture switch unit 404. In other words, the set of logic gates 406 in this example can be understood as available computing elements of the hardware processor 218 (with dynamic architecture) shown in FIG. 2A, and switch unit 404 can be seen as a miniature version of the architecture switch unit 216 shown in FIG. 2A.

Figure 4B:
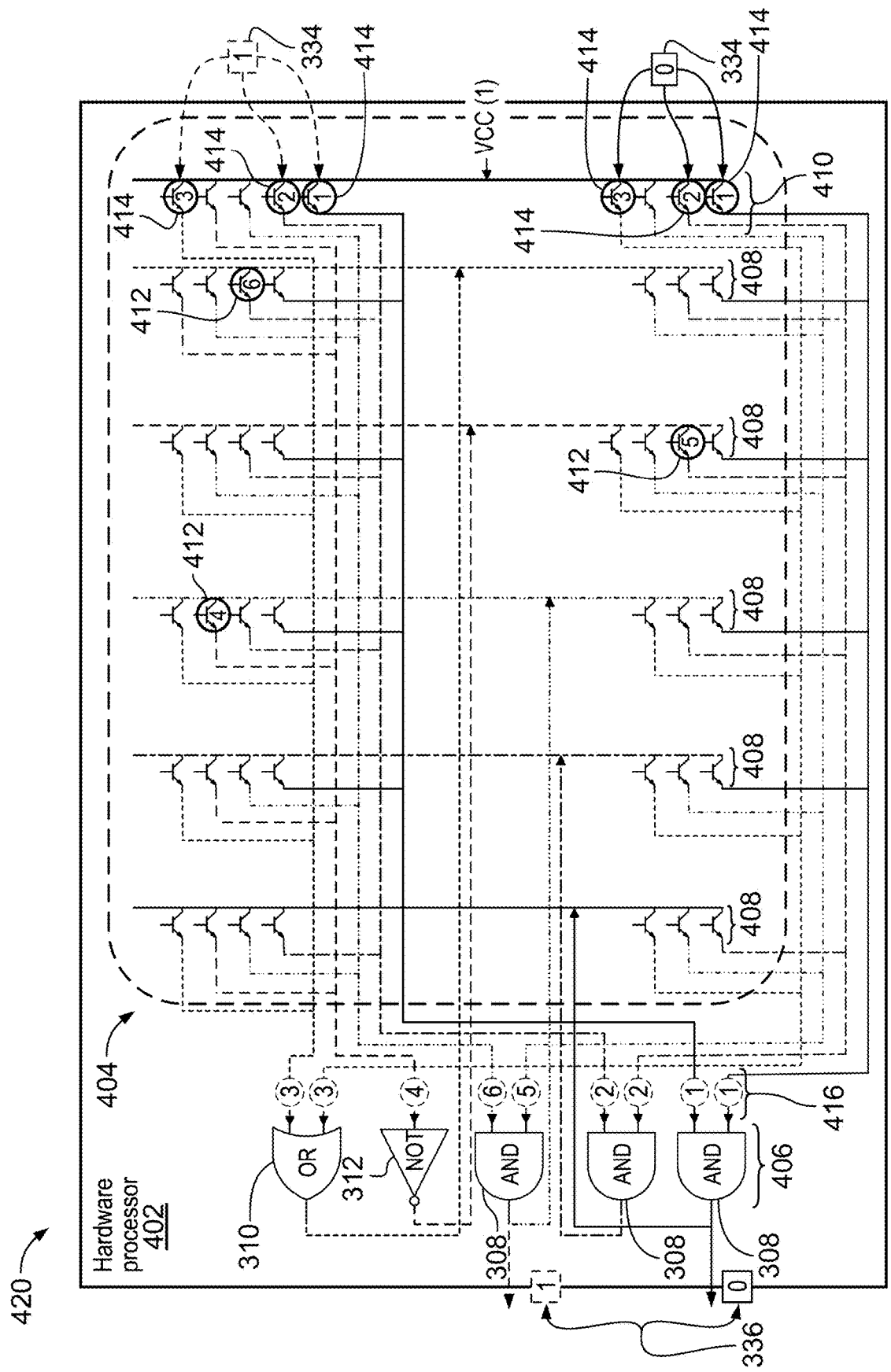

Returning to FIG. 3B, in a logic circuit 330, five computing elements can be used in a modified adder scheme to process the (A+B) operation. The computing elements include logic gates 308, 310 and 312 arranged to perform the function of an adder based on inputs 334, producing output 336. Items 332 that are numbered 1-6 on inputs to the computing logic gates and on interconnections among them correspond to switches 412 and 414 (and items 416) that are shown in FIG. 4B. In FIG. 4B, the switches 412 and 414 in the architecture switch unit 404 represent particular gates that if simultaneously opened can form the shape of an optimal architecture for the (A+B) operation demonstrated in the circuit 330 of FIG. 3B, whereby switches 412 (from the interconnection switches 408) are responsible for activating interconnections between logic gates, and switches 414 (from the input-control switches 410) serve as gates to control inputs to each of the computing elements. For example, the at least one of the possible settings of the physical interconnections (e.g., setting of switches 412 and switches 414) for the computing elements 406 can form input-to-output links between those computing elements in the hardware processor of the computer. This is done by specifying switches to be set for the physical interconnections (e.g., switches 412 and 414) in the hardware processor of the computer. Items 416 on inputs to logic gates have number labels that correspond the number labels for switches 412 and 414 among the interconnection switches 408 and the input-control switches 410 in the architecture switch unit 404 (as well as the items 332 in circuit 330 in FIG. 3B). The number labels 1-6 are just to show the correspondence or effect (but not the order) of opening the particular architecture switch unit switches 412 and 414 for the logic gates 406 so that the computing logic gates are assembled in a circuit 330 capable to perform an (A+B) operation. The logic circuit 420 takes inputs 334 and produces output 336—the same as in circuit 330 in FIG. 3B. Overall, the logic circuit 420, including the pattern of interconnection switches 412 and input-control switches 414 that are open, forms an optimal architecture for the (A+B) operation implemented with the gates 406 (similar to circuit 330 in FIG. 3B).

Figure 4C:
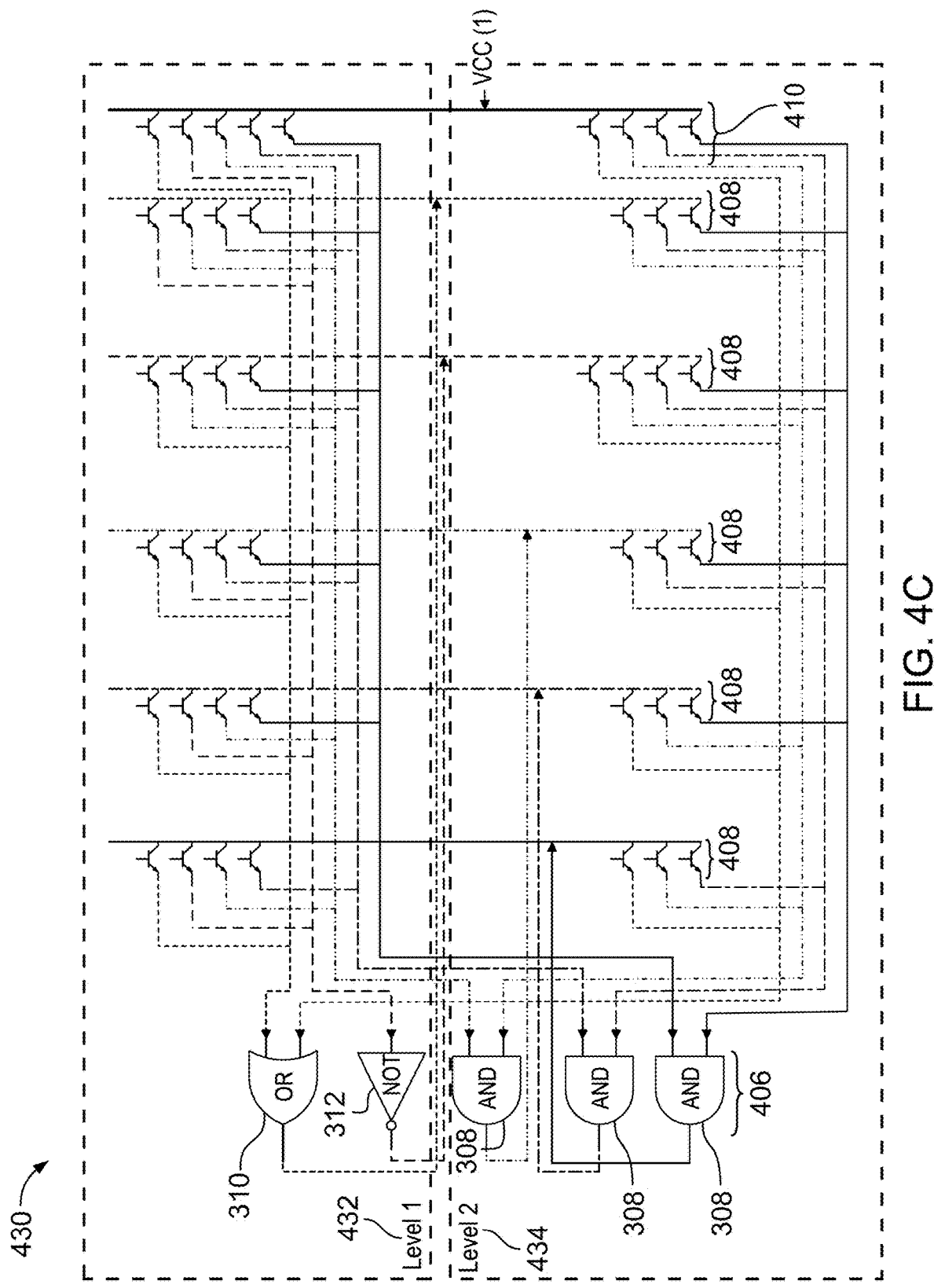

As shown in FIG. 4C, the dynamic architecture hardware processor (e.g., in the form of logic circuit 430) can be implemented using multi-layer chip technology. For example, different groups of the interconnection switches 408 and input-control switches 410 and the computing gates 406 can be located on separate layers (e.g., Level 1 432 and level 2 434) of a chip. While two layers are depicted in FIG. 4C, more than two layers can be used. Also, the layers can be specialized such that particular layers (or groups of layers) are generally used for certain functions, configurations and patterns of the switches 408 and 410 and the computing elements 406.

Figure 4D:
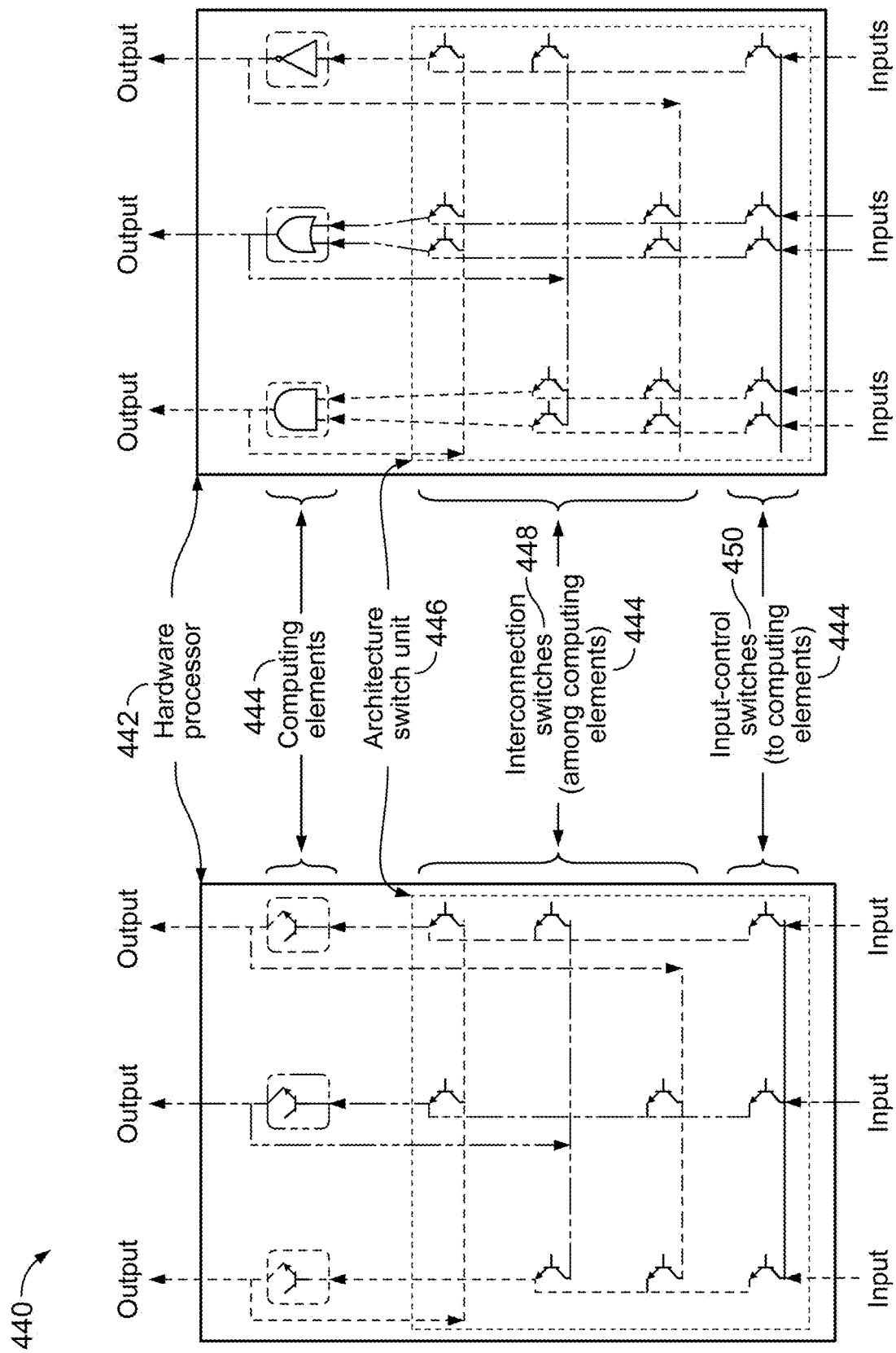
FIG. 4D is a large-scale view of interconnections for the computing elements (e.g., represented in the form of transistors in one example and logic gates in the other) in a dynamic hardware processor.

As noted above for the subject of present disclosure, the computing elements of the hardware processor can be transistors (or their equivalents in a given hardware processor) or predefined logic gates, or predefined sets of logic gates, or even the combination thereof. As such, in some implementations setting the switches can form an optimal architecture from any type (or combination) of the available computing elements. FIG. 4D shows an example 440 of a metamorphic hardware processor 442 realized in two variants: the first one (left hand side) is composed of the computing elements 444 in the form of transistors, the second (right hand side) is in the form of logic gates; this is to facilitate understanding of the possibility to form the optimal architecture from any other type and combination of computing elements. Similar to FIGS. 4A-4C, the architecture switch unit 446 in FIG. 4D contains interconnection switches 448 that are responsible for control of interconnections between computing elements 442 as well as input-control switches 450 controlling inputs to the computing elements 444. FIG. 4D also shows the details of how the connections between and to the different types of the computing elements can work and how those connections are controlled by interconnection switches 448 and input-control switches 450 in the hardware processor 442. In particular, each one of the computing elements 444 can be interconnected with each other one so that the output of each one of the computing elements 444 can be an input to each other one, and those connections are controlled by the interconnection switches 448. Also, each of the computing elements 444 can have a direct input controlled by the input-control switches 450. Different line patterns for the connecting lines show how the computing elements are specifically interconnected (via switches) among each other and how they are connected to switches controlling their inputs.

Each individual switch in FIG. 4D (as well as in FIGS. 4A-4C) is depicted as a single transistor (the most simple solution), however, in some implementations an individual switch in the metamorphic hardware processor (e.g., hardware processor 442 in FIG. 4D, or hardware processor 402 in FIGS. 4A-4C, or hardware processor 218 in FIG. 2) can also be realized in different forms, e.g., as an equivalent of a single transistor, or as a set of several transistors (or their equivalents), or as a suitable logic gate (e.g., basic AND gate), or as a predefined set of logic gates (e.g., when the architecture switch unit is being programmed in the FPGA where the switches can be constructed from multiplexers or other available blocks/elements suitable for this task). Also, in some implementations a number of individual switches (e.g., within the architecture switch unit 446 or the architecture switch unit 404) can be combined into one or more complex structures (or switch units) to provide control over multiple interconnections between computing elements and/or multiple inputs to computing elements.

Figure 5:
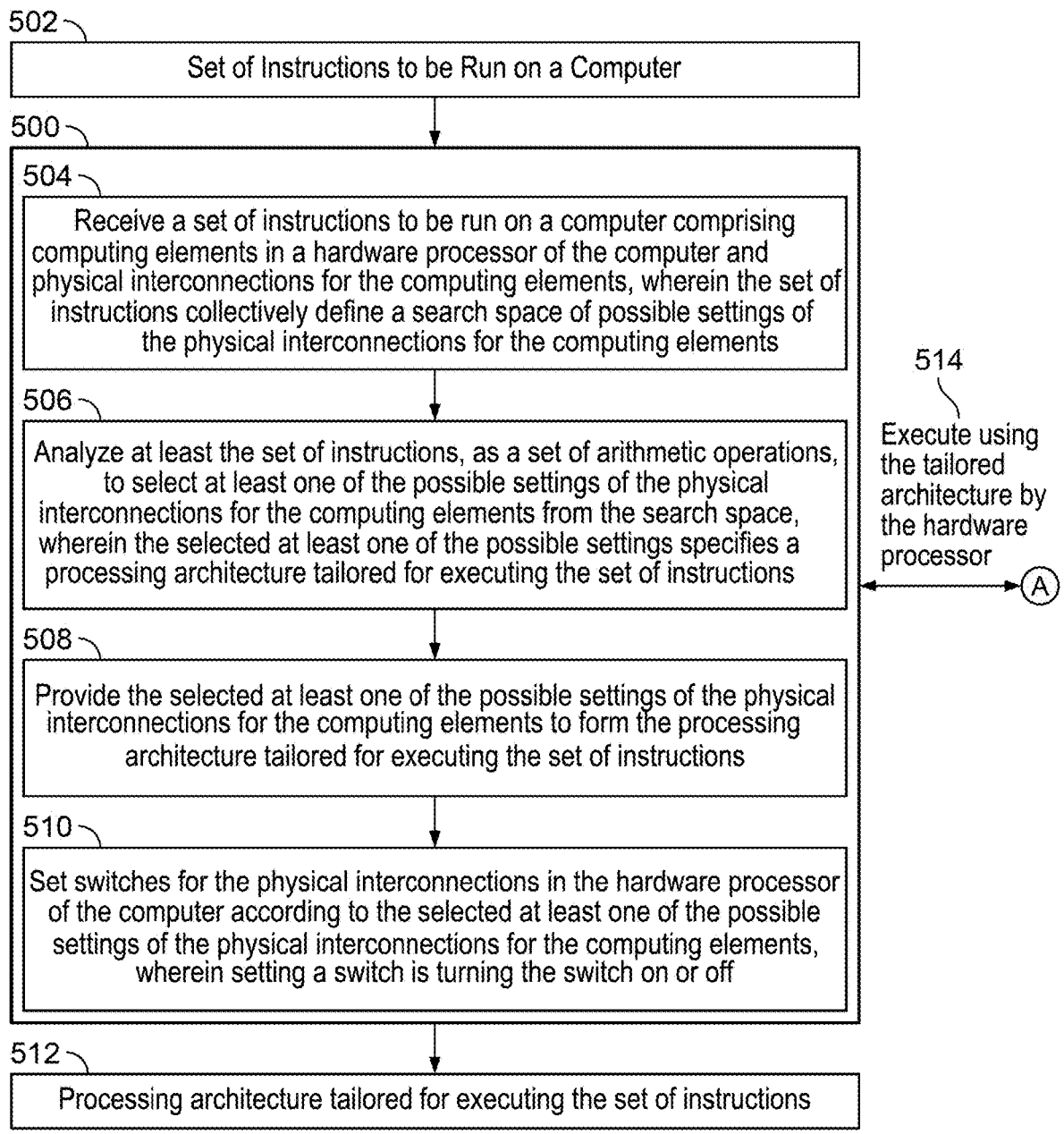
FIG. 5 is a flow chart showing an example of a method for generating a processing architecture tailored for executing a set of instructions.
Figure 5:
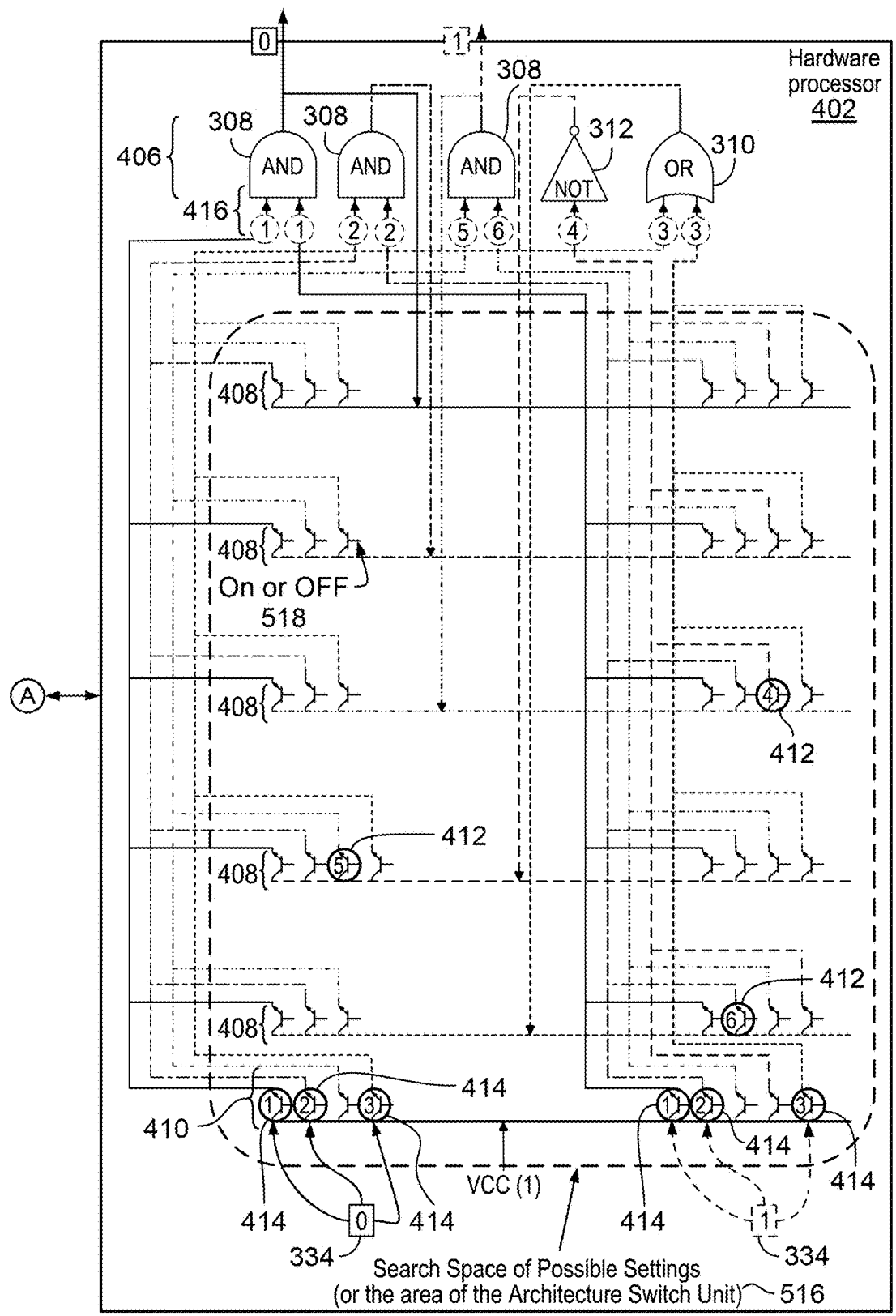

As shown in FIG. 5, a method 500 can be used to generate a processing architecture tailored for executing the set of instructions. The method 500 can be used, for example, to generate the optimal architecture instructions 222 (see FIG. 2). FIGS. 6A-6E show method details and system components that can be used to implement the operations of method 500.

At operation 504, a set of instructions 502 (e.g., the set of instructions 102 in FIG. 2) is received for instructions that are to be run on a computer. The computer comprises computing elements 406 in a (metamorphic) hardware processor 402 of the computer and physical interconnections (interconnection switches 408 and input-control switches 410) for the computing elements 406. The set of instructions collectively defines a search space 516 of possible settings of the physical interconnections for the computing elements 406, meaning that there may be several different configurations of the computing elements 406 that can be tailored to meet the requirements of the set of instructions 502. For example, the search space 516 can be defined as an architecture switch unit 404 area or as a space of all available switches (i.e., switches controlling interconnections between every pair of computing elements as well as switches serving as input gates to each of the computing elements) needed for assembling the optimal architecture that meets the requirements of the set of instructions 502.

At operation 506, the set of instructions 502 can be analyzed as a set of arithmetic operations, such as an analysis performed by the architecture controller 224 using the controlling software 210 run on the second processor 208 in FIG. 2. Analysis of instruction, as a set of arithmetic operations, means that analysis is performed as if the set of instructions is expressed in arithmetic terms. In one example, the set of instructions 502 can refer to the received instructions being converted to (or understood as) arithmetic operations as described in U.S. Pat. No. 11,029,920 B1, the contents of which are incorporated in their entirety. In another example, the set of instructions 502 can refer to received instructions having only arithmetic operations, either because the program was written that way, or because the program was already converted to arithmetic operations before it was sent. Regardless of the source or the type of the set of instructions, the set of instructions 502 can be analyzed to select at least one of the possible settings (e.g., selected setting of interconnection switches 408 and input-control switches 410) of the physical interconnections for the computing elements 406 from the search space 516. The selected at least one of the possible settings specifies a processing architecture 512 tailored for executing the set of instructions 502, such as a selection of the switches 412, 414 (from interconnection switches 408 and input-control switches 410 respectively) that can be used to interconnect the gates 406 needed to execute the set of instructions 502. For example, the architecture controller 224 (as shown in FIG. 2) can perform an analysis of the set of instructions and optimal architecture set up.

At operation 508, once the set of instructions is analyzed, the selected at least one of the possible settings (e.g. a setting of switches 412 and switches 414) of the physical interconnections (represented by groups of interconnection switches 408 and input-control switches 410) for the computing elements 406 is provided to form the processing architecture 512 tailored for executing the set of instructions. For example, the architecture controller 224 (in FIG. 2) can provide optimal architecture instructions 222 (e.g., for each processor clock cycle) to the architecture switch unit 216 (configured to dynamically change configurations of logic gates 406 by operating interconnection switches 408 and input-control switches 410). It is noted that each one of the possible settings can constitute the architecture switch unit setting for a single clock cycle. When the optimal architecture for the set of instructions requires two or more clock cycles to execute (which can happen, for example, if the received set of instructions is complex enough to require two or more clock cycles) then two or more of the possible settings can be used.

After the selected at least one of the possible settings of the physical interconnections for the computing elements is provided, the optimal architecture can be turned on. For example, as shown in FIG. 2 the architecture switch unit 216 can perform a reorganization of interconnections between computing elements in the processor 218, in accordance with instructions 222 from the architecture controller 224 (comprised of the controlling software 210 run on the second processor 208). This reconfiguration can be done at operation 510 shown in FIG. 5 by setting switches for the physical interconnections (e.g., interconnection switches 408 and input-control switches 410) in the hardware processor 402 of the computer according to the selected at least one of the possible settings of the physical interconnections (e.g., a combination of switches 412 and 414) for the computing elements (e.g., logic gates 406). Setting a switch is turning the switch on or off (518). Once the switches are set, the set of instructions (or a portion thereof) is executed at operation 514 using the tailored architecture 512 of the hardware processor 402 of the computer.

In some implementations, setting the switches can lead to establishing the optimal architecture, as shown in FIG. 5, where setting the switches can include setting a minimum number of switches (e.g., switches 412 and 414) sufficient to execute the set of instructions (e.g., operation (A+B) discussed in disclosure to FIG. 3B) using the hardware processor 402 of the computer. This can be done by finding a minimum number of switches out of the search space 516 (or interconnection switches 408 and input-control switches 410) to turn the optimal architecture on. Setting the switches can establish the (optimal) processing architecture 512 tailored for executing the set of instructions.

Figure 6A:
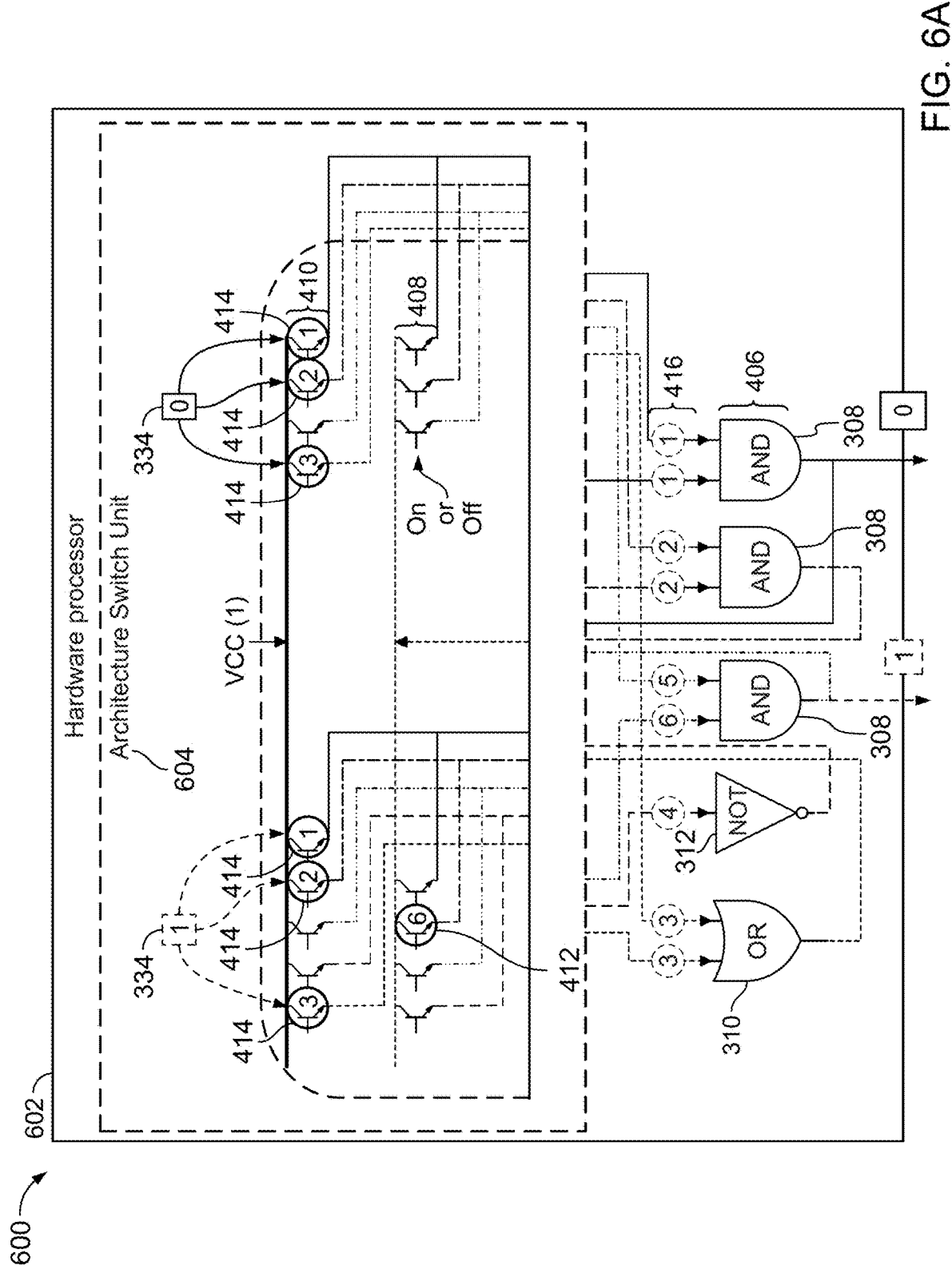
FIGS. 6A-6F are block diagrams showing methods as well as components and different configurations of systems used in a dynamic processor architecture, including to provide various implementations of FIGS. 2 and 5.

As shown in FIG. 6A, the systems and techniques of the present disclosure can be implemented in a computer system 600 that includes a hardware processor 602 (e.g., hardware processor 402 in FIG. 4B or hardware processor 218 in FIG. 2) and an architecture switch unit 604 (e.g., architecture switch unit 404 in FIG. 4B or architecture switch unit 216 in FIG. 2). The hardware processor 602 includes multiple computing elements 406 (such as shown on the hardware processor 402 in FIGS. 4A-4B, 5) and physical interconnections (e.g., interconnection switches 408 and input-control switches 410) for the multiple computing elements 406. Each computing element in the multiple computing elements 406 is connected to each other element 406 through at least one of the interconnection switches 408 while inputs to each of the computing elements 406 are managed by input-control switches 410. As will be appreciated, the switches for the physical interconnections can be understood as being part of the architecture switch unit, and in some implementations, the architecture switch unit 604 can be an integral part of the hardware processor 602, while in some other implementations the architecture switch unit 604 and the hardware processor 602 can be implemented on separate chips but physically connected to each other via bus lines. In any case, the architecture switch unit 604 (e.g., architecture switch unit 216 in FIG. 2) is configured to set switches 412 and 414 (from interconnection switches 408 and input-control switches 410) for the physical interconnections in the hardware processor 602 according to received settings of the physical interconnections for the multiple computing elements 406. Setting switches 412 and 414 can form input-to-output links between (and route input data to) computing elements 406 in the hardware processor 602, wherein setting a switch is turning the switch on or off.

In some implementations, the analysis provided by the architecture controller 224 (comprised of the controlling software 210 run on the second processor 208) described in FIG. 2 can include a partition-and-sort process for analyzing independent and dependent instructions to define (details of) the optimal architecture to execute the set of instructions 502. As described in more details in connection with example 620 of FIG. 6B, the set of instructions 624 can be instructions from one or more computer programs (programs P1 and/or P2 622), and analyzing 630 the set of instructions 624 (by a second processor 626 having predefined processor architecture 628) can include: partitioning 632 the instructions to determine 634 variants of arithmetic operations in the instructions; sorting 636 elements of the variants of the arithmetic operations; and determining 638, based on at least a result of the sorting: (i) which of the variants of the arithmetic operations to use, (ii) a number of clock cycles that is needed, (iii) an execution order of the instructions from the one or more computer programs, and (iv) which instructions will be executed in which of the one or more consecutive clock cycles. In some implementations, a partition algorithm can be implemented as a series of independent computations (e.g., using Reverse Polish Notation or any other notation suitable for this task). Sorting the elements can include, for example, grouping the elements according to x-bit values. Note that the purpose of sorting is to determine the optimal composition of arithmetic operations (from the perspective of the element's values). In an example involving logic gates in FIG. 3C, e.g., in case of an (A+B+C) arithmetic operation (where A and B are 1-bit values and C is a 2-bit value), the optimal variant of arithmetic operations and their order is ((A+B)+C) but not (A+(B+C)) or ((A+C)+B). This is because ((A+B)+C) requires fewer computing elements for execution and minimum number of switches to be set (thus representing the optimal architecture) as compared with the other two variants.

Figure 6B:
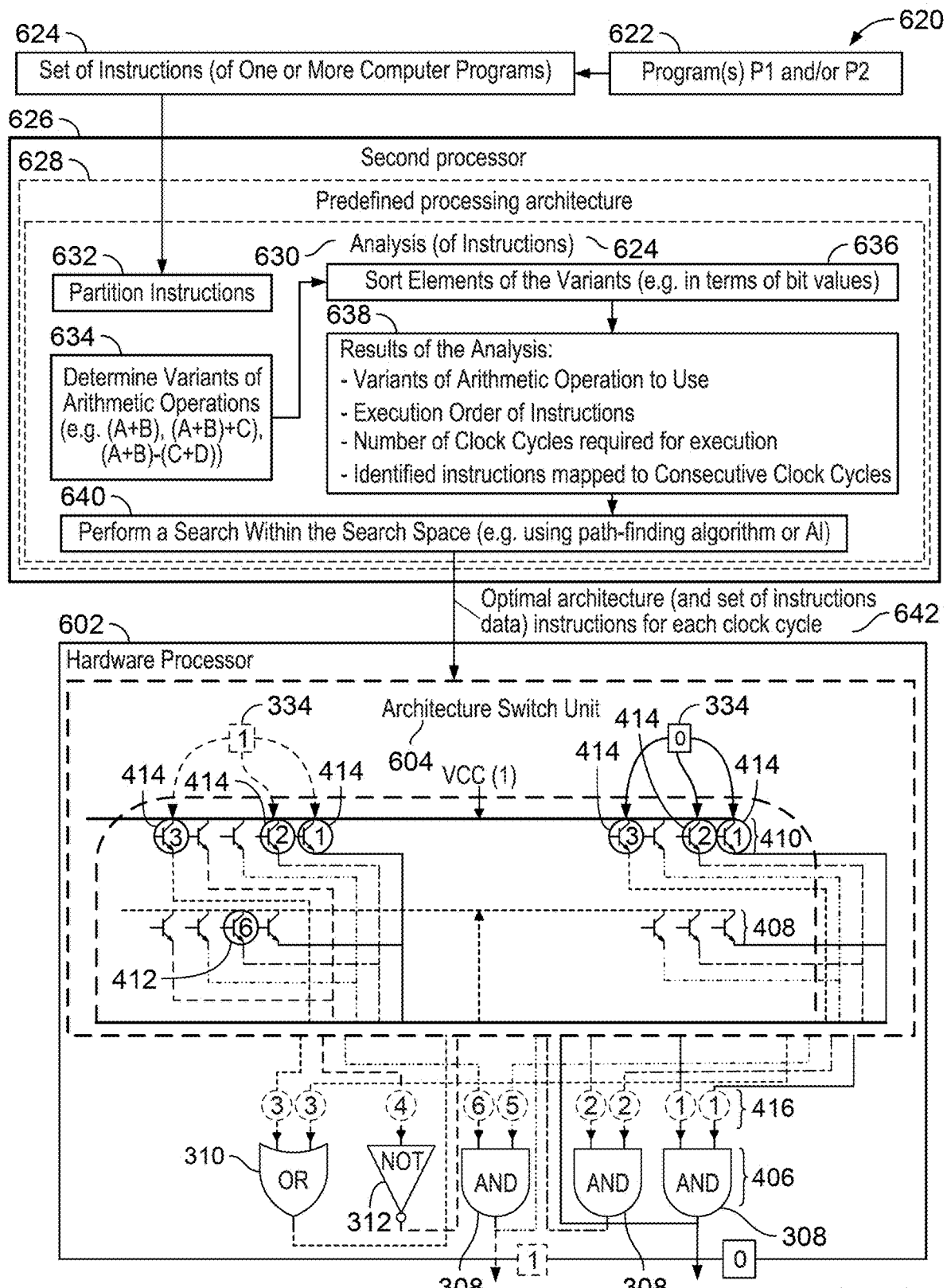

As shown in FIG. 6B, analyzing 630 the instructions 624, as the set of arithmetic operations, to select the at least one of the possible settings of the physical interconnections (e.g., a setting of switches 412 and switches 414) for the computing elements 406 from the search space (e.g., architecture switch unit 604 area) can include performing a search 640 within the search space of the possible settings of the physical interconnections (e.g., interconnection switches 408 and input-control switches 410) for the computing elements 406 using a path finding algorithm (e.g., Dijkstra's or any other suitable optimization algorithm for resolving a shortest path problem) or using a reinforcement learning algorithm (e.g., Q-learning reinforcement learning algorithm or a deep reinforcement learning algorithm, or any other suitable specifically trained AI model). Both, the pathfinding program or the AI model can be used (separately or in combination), for example, to find an efficient configuration of the interconnection switches 408 and input-control switches 410 for forming the optimal architecture 642 out of the gates 406. AI can be trained, for example, based on previous (or available) selections of the switches to find more efficient selections of the switches for similar (or new) types of sets of instructions. More details on applying these tools are provided above in this disclosure.

Figure 6C:
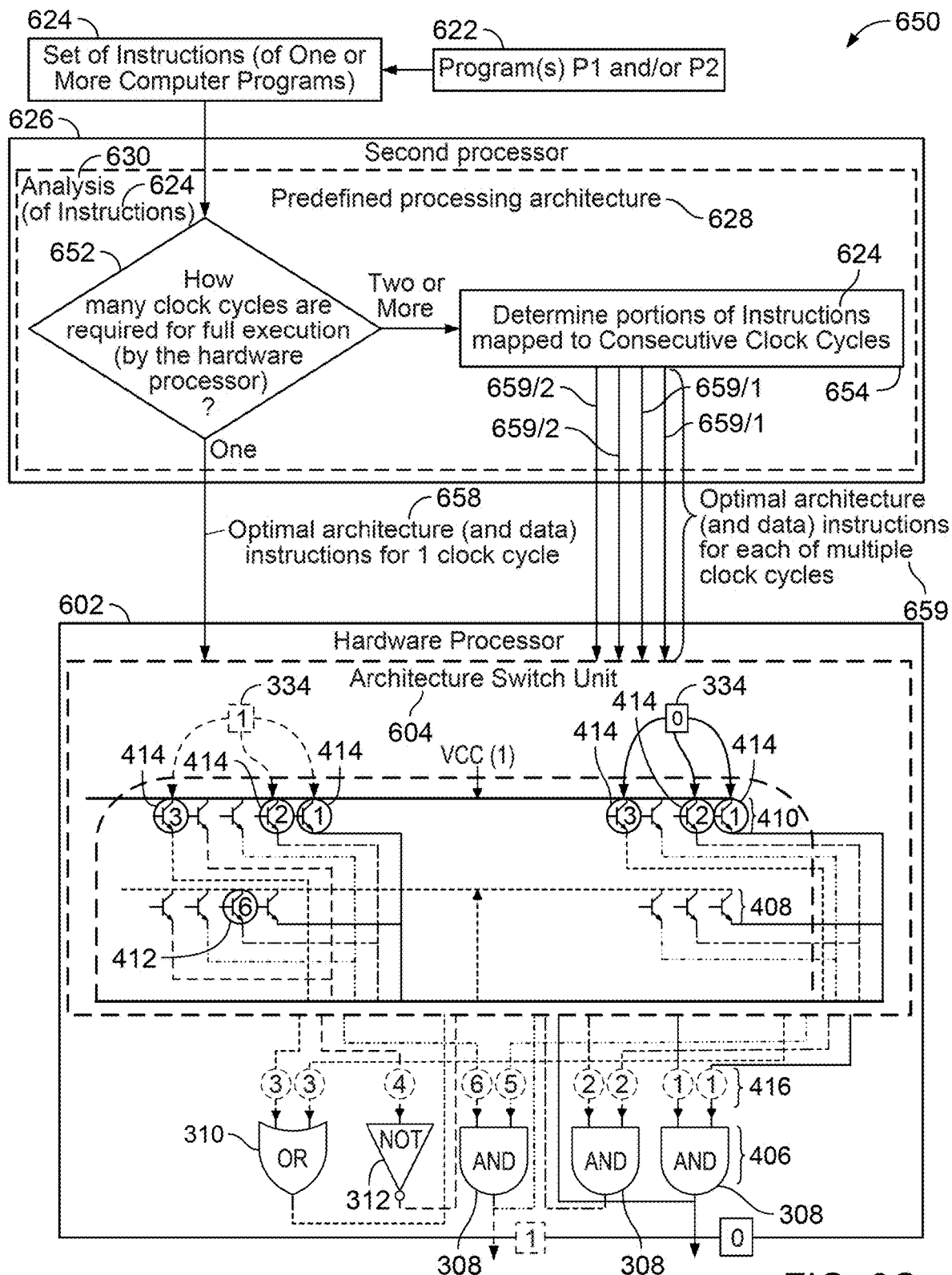

In some implementations, executing the (e.g., relatively uncomplex) set of instructions can include performing a single clock cycle execution for some sets of instructions. For example, as shown in FIG. 6C the set of instructions 624 is received by the second processor 626 (with predefined processing architecture 628) where as part of the analysis 630 it can be decided whether executing the set of instructions 624 using the hardware processor 602 of the computer can be done in a single clock cycle of the hardware processor of the computer. When decided so, the respective optimal architecture instructions 658 (interconnection and input data settings) are provided to the architecture switch unit 604 of the hardware processor 602 for reconfiguration and execution. In the other example also shown in FIG. 4B, the (A+B) operation is simple enough to be executed in a single clock cycle by the hardware processor 402.

It is noted that a given set of instructions may not always be able to be executed in one clock cycle even though minimizing the number of clock cycles required to execute the set of instructions may be the goal of the analysis. In some implementations, two or more clock cycles may be needed for some sets of instructions. In an example shown in FIG. 6C, analyzing 630 at least the set of instructions 624 can include: determining 652 that executing the set of instructions using the hardware processor 602 of the computer requires two or more consecutive clock cycles of the hardware processor of the computer; and determining 654 which portions of the set of instructions will be executed in which of the two or more consecutive clock cycles using the at least one of the possible settings of the physical interconnections (e.g., a setting of switches 412 and switches 414) for the computing elements 406 in the hardware processor of the computer. For example, analysis (e.g., analysis by the architecture controller 224 run on the second processor 626) may conclude that a complex set of computer instructions is not executable in a single clock cycle due to an insufficient capacity of the hardware processor 602 (i.e., insufficient number of its computing elements) for particular instruction complexity. This can be true whether the instructions were to be executed in a static architecture or the dynamic architecture of the present disclosure. As such, the second processor 626 (that can also be considered as part of the architecture controller 224 from FIG. 2) may provide optimal architecture instructions 659 for multiple processor clock cycles to the architecture switch unit 604 of the hardware processor 602.

In cases when set of instructions 624 in FIG. 6C require two or more cycles to complete the execution, the switch settings can be changed (in accordance with optimal architecture instructions 659) between at least two of the two or more clock cycles to execute the set of instructions 624. For example, the at least one of the possible settings of the physical interconnections for the computing elements (i.e., the optimal architecture for the set of instructions 624) represents two or more of the possible settings, and different ones (e.g., 659/1 and 659/2) of the two or more of the possible settings are used in at least two of the two or more consecutive clock cycles of the hardware processor of the computer. However, this might not always be required. For example, the same switch settings (e.g., 659/1 and 659/1 or 659/2 and 659/2) can be used for the instructions over two or more clock cycles when the instructions are from a loop (e.g., using a same instruction with the same or a different values). In general, when two or more clock cycles are required for the optimal architecture to execute a given set of instructions, the optimal architectures allocated to each consecutive clock cycle might be different or identical.

Figure 6D:
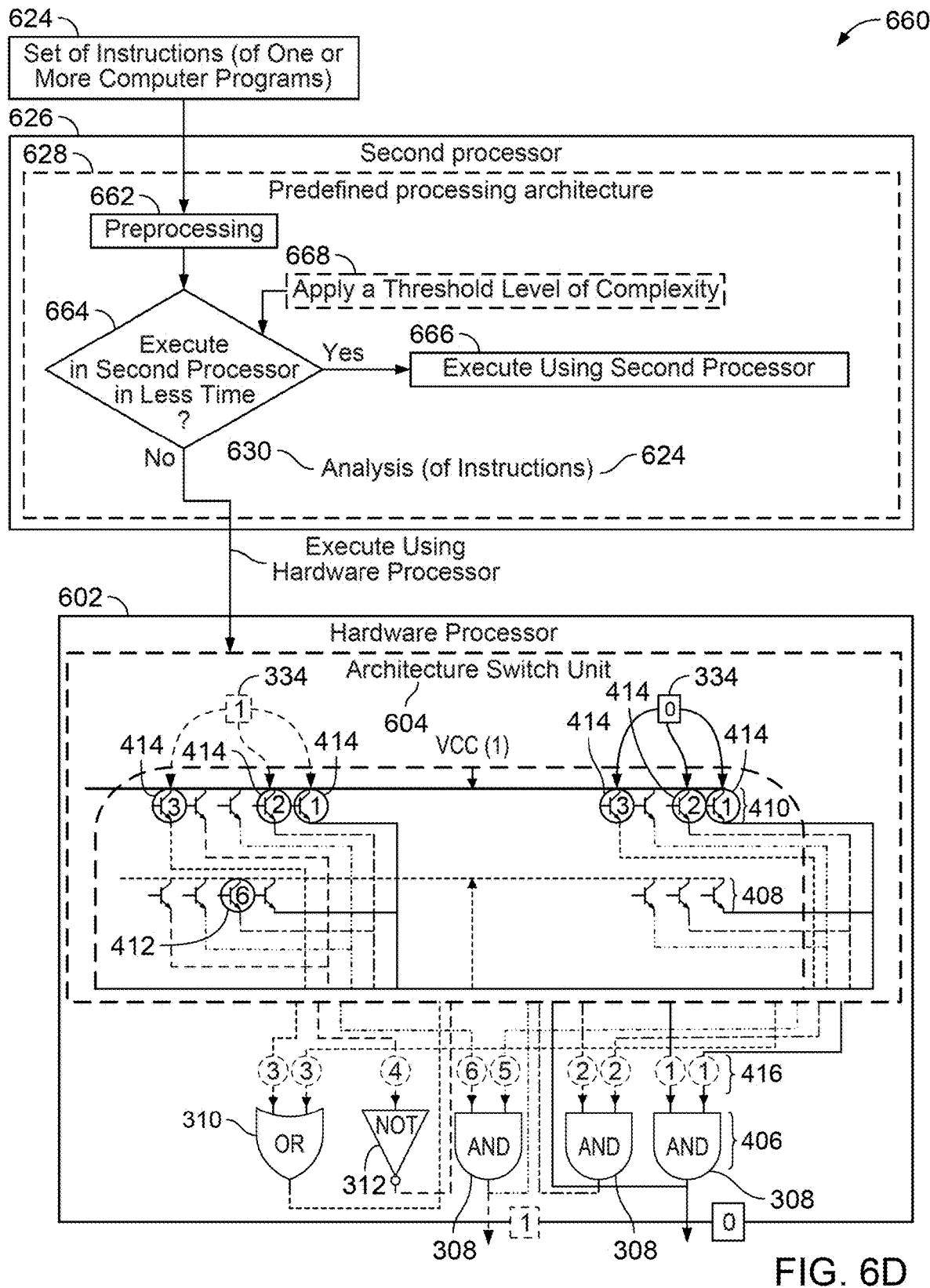

In some implementations, as shown in an example 660 of FIG. 6D, analyzing 630 can be preceded by preprocessing 662 the instructions to confirm that a tailored processing architecture and subsequent execution of the instructions by the hardware processor (with dynamic architecture) should occur. For example, receiving the set of instructions can be done by a second processor (e.g., the second processor 626 with respect to FIG. 6D or the second processor 208 from FIG. 2) different from the hardware processor (e.g., hardware processor hardware processor 602 or the hardware processor 218 from FIG. 2), where the second processor 626 has a predefined (static) processing architecture 628. Then, a determination 664 can be made by the second processor 626 that the set of instructions 624 cannot be executed (more efficiently) using the second processor having the predefined processing architecture in less time than it would take otherwise (e.g., to complete analysis of the set of instructions, to form the processing architecture tailored for executing the set of instructions in the hardware processor, and to execute the set of instructions using the hardware processor 602 of the computer). The second processor 626 can also perform any of the analyses previously described above, e.g., with respect to FIG. 2. In some implementations, the determination 664, by the second processor, that the set of instructions cannot be executed (more efficiently) using the second processor can be part of the analyzing operation 506 above.

In some implementations, different instructions that are better executed on a traditional processor architecture can be preprocessed. For example, the set of instructions can be a first set of instructions. Then, a second set of instructions different from the first set of instructions can be received by the second processor. As described with respect to the second processor 626 and preprocessing 662 of FIG. 6D, a determination 664 can be made by the second processor 626 (or the second processor 208 in FIG. 2) that the second set of instructions can be executed on the second processor in less time than it would take to complete analysis of the second set of instructions, form a processing architecture tailored for executing the second set of instructions in the hardware processor, and execute the second set of instructions using the hardware (dynamic) processor 602 of the computer (or the hardware processor 218 from FIG. 2). The second set of instructions can then be executed 666 using the second processor (e.g., second processor 626) having the predefined processing architecture. For example, a threshold level of complexity 668 of an instruction can be applied, where the threshold determines whether or not the instruction is to be executed on a traditional processor architecture or a dynamic processor architecture. Also, determining, by the second processor, that the second set of instructions can be executed on the second processor can be part of the analyzing operation 506 above.

Figure 6E:
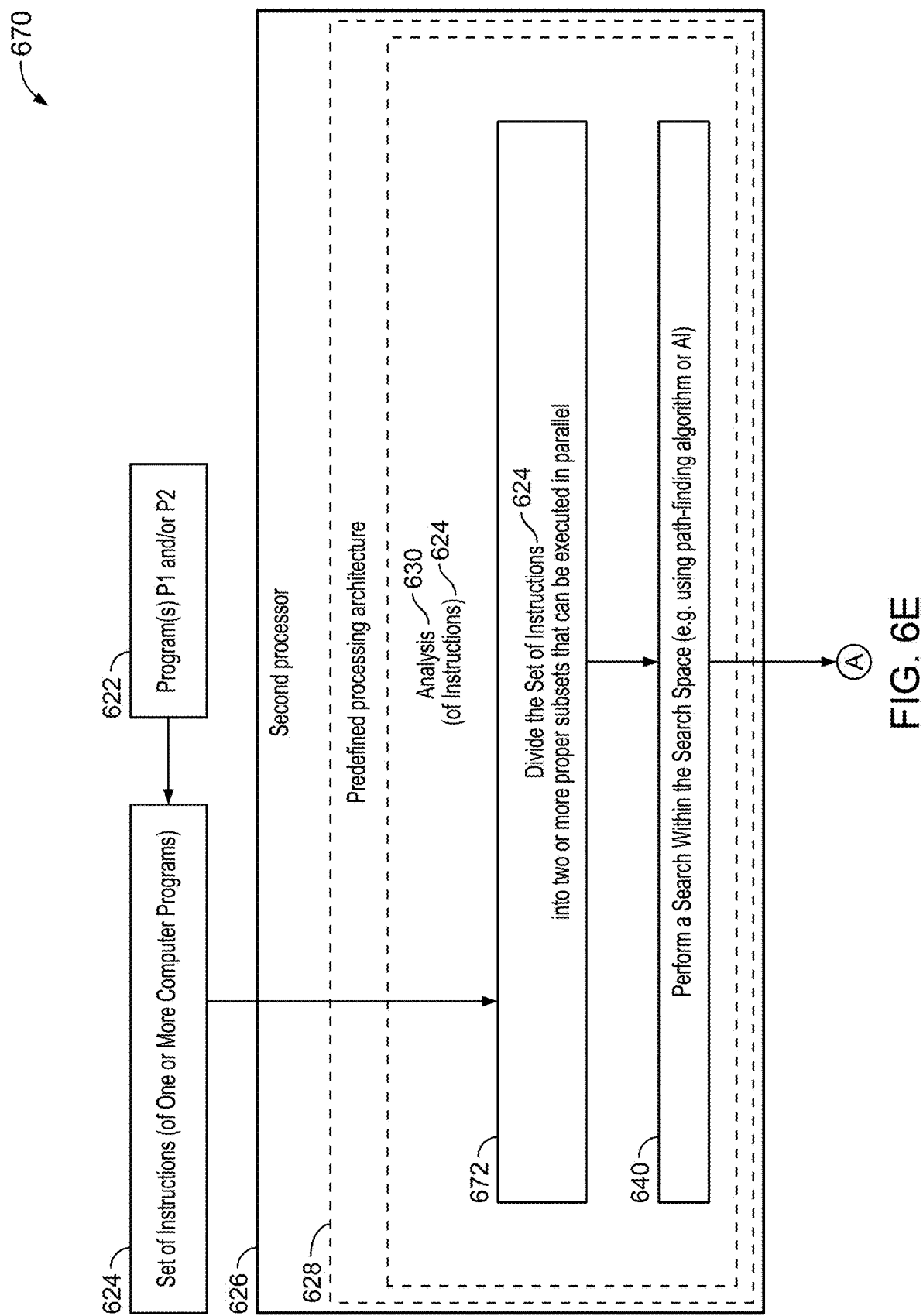
Figure 6E:
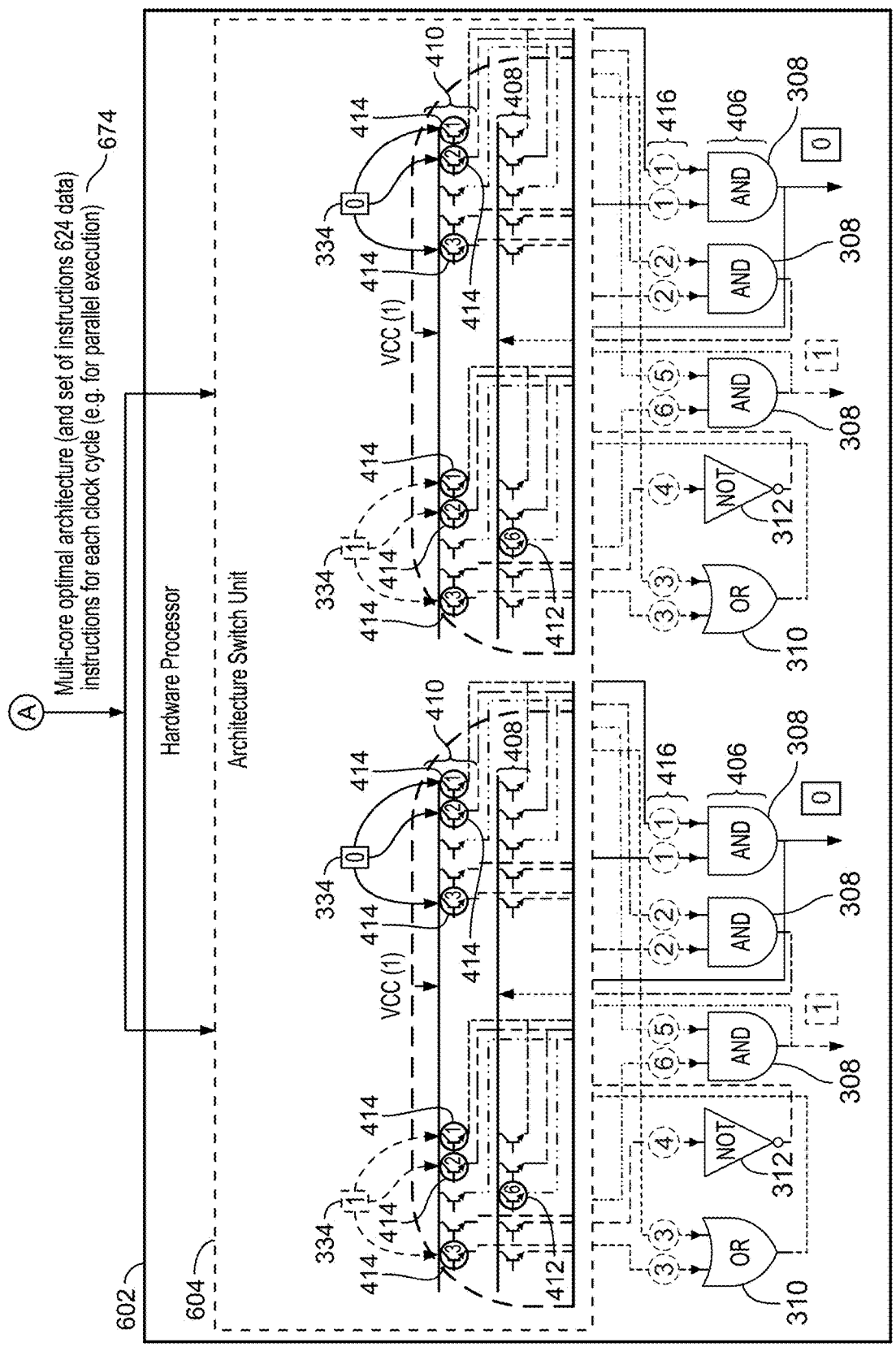

As shown in schematic 670 of FIG. 6E, in some implementations, as the result of the analyzing process 630, a multi-core architecture case can be used. The set of instructions 624 can be divided 672 into two or more proper subsets (e.g., portions of the instructions that are independent from each other) that can be executed in parallel in at least one of the one or more consecutive clock cycles, and so the selected settings of the physical interconnections (e.g., optimal architecture instructions 674) form respective processing cores for the proper subsets of the instructions. In these and other implementations, the instructions can be from the same program or from two or more different computer programs (e.g., program(s) P1 and/or P2 622). For example, one subset of instructions can correspond to the (A+B) operation, and another (e.g., independent from the first one) subset of instructions can be for an operation (C+D) from the same or different program than the (A+B) operation. See FIG. 6E for details regarding multi-core optimal architectures.

Figure 6F:
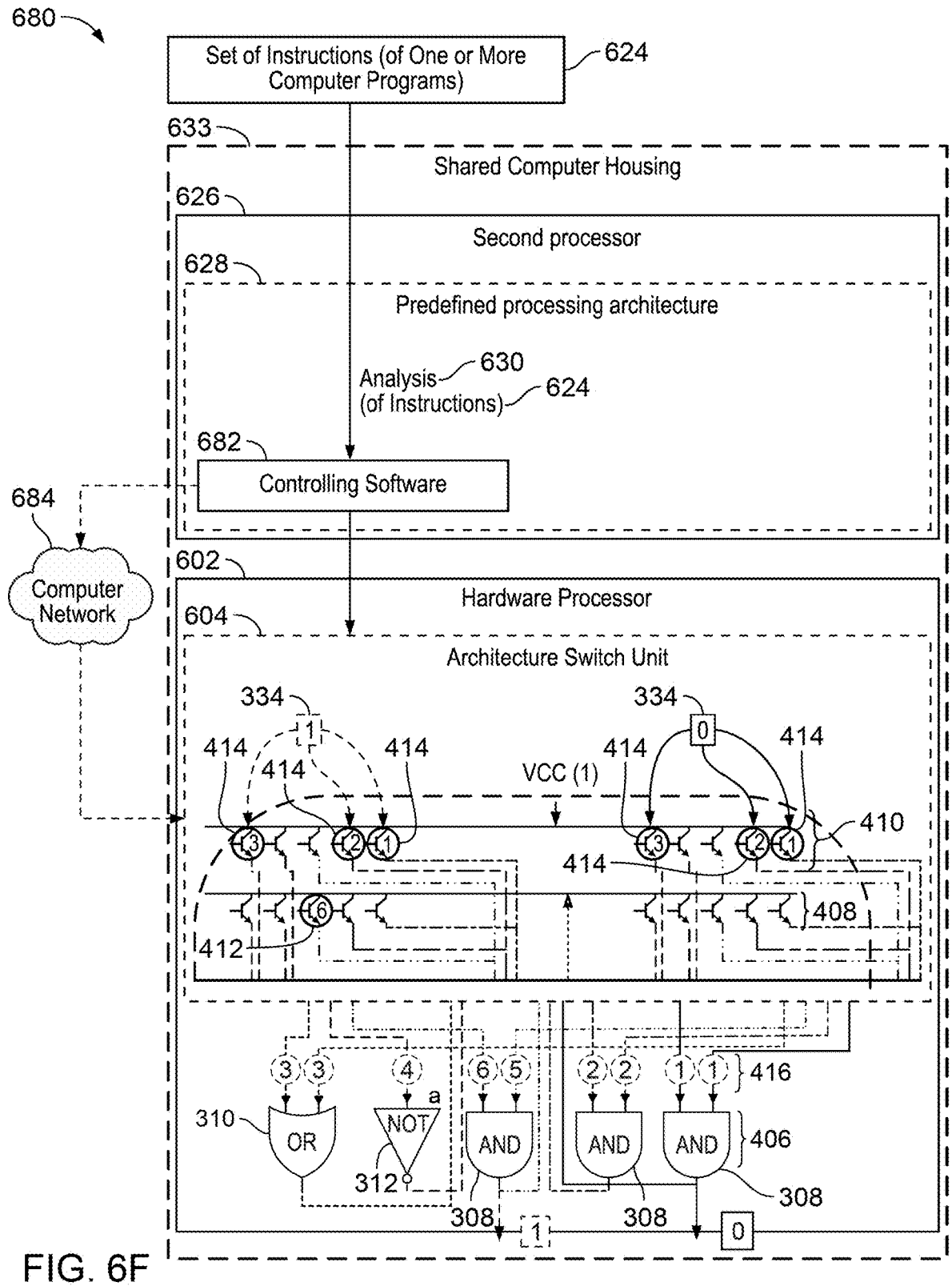

As shown in FIG. 6F, in some implementations, the second processor 626 can be contained within a shared computer housing 633 (indicated with dashed lines) that also contains the hardware processor 602 and the architecture switch unit 604. In some (e.g., other) implementations, controlling software 682 that runs on the second processor 626 can be configured to communicate (indicated with thick dashed lines) over a computer network 684 (e.g., the Internet) to operate the architecture switch unit 604.

More powerful processors require more physical transistors to make complex arithmetic computations. A useful feature of arithmetic operations is that complex tasks can readily be analyzed to determine an optimal configuration of computing elements in the hardware processor that is the best fit for the execution of a given set of instructions based on modern optimization algorithms and/or suitable AI models.

The systems and techniques described above lay out the principles of a flexible dynamic or "metamorphic" (i.e., self-changing) architecture that compares favorably with traditional static architectures, as the presented systems and techniques facilitate efficient utilization of computing resources (or 'computing elements' as defined in the present disclosure) in the best possible way. The subject systems and techniques can assemble computing elements of the processor into an optimal architecture to enable execution of a given set of instructions in a minimum number of clock cycles, thus using less time to execute those instructions. As a result, by way of utilizing maximum processor capacity to execute received instructions, the efficiency (e.g., execution speed) of a given processor can be substantially increased. Moreover, using the described technology, the chip's physical size can be reduced without compromising its productivity (e.g., if compared to static architectures of the same size). The goal can be to create a universal processing solution (e.g., in the form of a dynamic or metamorphic processor) with a flexible architecture adapting to each particular set of instructions and that is efficient for multiple various tasks without the need to create specialized (static) architectures for each narrow task area in a traditional way.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as a hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing, and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, special purpose microprocessors. Generally, a processor will receive instructions and data from a read-only memory or a random access memory, or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media, and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display) display device, an OLED (organic light emitting diode) display device, or another monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship between client and server arises by virtue of computer programs running on the respective computers and having a client-server relationship with each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can, in some cases be excised from the combination, and the claimed combination may be directed to a subcombination or variation of a subcombination. Thus, unless explicitly stated otherwise, or unless the knowledge of one of ordinary skill in the art clearly indicates otherwise, any of the features of the embodiments described above can be combined with any of the other features of the embodiments described above.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

EXAMPLES

Although the present application is defined in the attached claims, it should be understood that the present invention can also (additionally or alternatively) be defined in accordance with the following examples:

Example 1. A method comprising:
  receiving a set of instructions to be run on a computer comprising computing elements in a hardware processor of the computer and physical interconnections for the computing elements, wherein the set of instructions collectively define a search space of possible settings of the physical interconnections for the computing elements;
  analyzing at least the set of instructions, as a set of arithmetic operations, to select at least one of the possible settings of the physical interconnections for the computing elements from the search space, wherein the selected at least one of the possible settings specifies a processing architecture tailored for executing the set of instructions; and providing the selected at least one of the possible settings of the physical interconnections for the computing elements to form the processing architecture tailored for executing the set of instructions.

Example 2. The method of Example 1, wherein the computing elements comprise transistors, predefined logic gates, predefined sets of logic gates, or a combination thereof, and the method comprises:

setting switches for the physical interconnections in the hardware processor of the computer according to the selected at least one of the possible settings of the physical interconnections for the computing elements, wherein setting a switch is turning the switch on or off; and executing the set of instructions using the hardware processor of the computer.

Example 3. The method of Example 2, wherein setting the switches comprises setting a minimum number of switches required to execute the set of instructions using the hardware processor of the computer.

Example 4. The method of Example 2, wherein the providing comprises providing a first matrix and second matrix, the first matrix having values that control the setting of the switches, the second matrix having input values for executing the set of instructions, and executing the set of instructions using the hardware processor of the computer comprises executing the set of instructions in a single clock cycle of the hardware processor of the computer.

Example 5. The method of any one of Examples 1-4, wherein analyzing at least the set of instructions comprises:

determining that executing the set of instructions using the hardware processor of the computer requires two or more consecutive clock cycles of the hardware processor of the computer; and determining which portions of the set of instructions will be executed in which of the two or more consecutive clock cycles using the at least one of the possible settings of the physical interconnections for the computing elements in the hardware processor of the computer.

Example 6. The method of Example 5, wherein the at least one of the possible settings is two or more of the possible settings, and different ones of the two or more of the possible settings are used in at least two of the two or more consecutive clock cycles of the hardware processor of the computer.

Example 7. The method of any one of Examples 1-6, comprising:

receiving one or more assembler commands or assembler instructions; and setting switches for the physical interconnections in the hardware processor of the computer in response to the one or more assembler commands or assembler instructions to control tailoring of a processing architecture of the hardware processor.

Example 8. The method of any one of Examples 1-6, wherein the set of instructions are instructions from one or more computer programs, and the analyzing comprises:

partitioning the instructions to determine variants of arithmetic operations in the instructions;

sorting elements of the variants of the arithmetic operations; and determining, based on at least a result of the sorting, (i) which of the variants of the arithmetic operations to use, (ii) a number of clock cycles needed, (iii) an execution order of the instructions, and (iv) which instructions will be executed in which of one or more consecutive clock cycles.

Example 9. The method of Example 8, comprising dividing the instructions into two or more proper subsets of the instructions that will be executed in parallel in at least one of the one or more consecutive clock cycles.

Example 10. The method of Example 9, wherein the instructions are from two or more independent computer programs.

Example 11. The method of any one of Examples 1-10, wherein the receiving is done by a second processor different from the hardware processor, the second processor having a predefined processing architecture, and the method comprises:

determining, by the second processor, that the set of instructions cannot be executed using the second processor having the predefined processing architecture in less time than it would take to complete analysis of the set of instructions, form the processing architecture tailored for executing the set of instructions in the hardware processor and execute the set of instructions using the hardware processor of the computer.

Example 12. The method of Example 11, wherein the set of instructions is a first set of instructions, and the method comprises:

receiving, by the second processor, a second set of instructions different from the first set of instructions;

determining, by the second processor, that the second set of instructions can be executed on the second processor in less time than it would take to complete analysis of the second set of instructions, form a processing architecture tailored for executing the second set of instructions in the hardware processor and execute the second set of instructions using the hardware processor of the computer; and executing the second set of instructions using the second processor having the predefined processing architecture.

Example 13. The method of any one of Examples 1-12, wherein the computing elements comprise transistors, and the at least one of the possible settings of the physical interconnections for the computing elements forms a set of logic gates from the transistors and input-to-output links between logic gates in the set of logic gates by specifying switches to be set for the physical interconnections in the hardware processor of the computer.

Example 14. The method of any one of Examples 1-12, wherein the computing elements comprise predefined logic gates, and the at least one of the possible settings of the physical interconnections for the computing elements forms input-to-output links between the predefined logic gates in the hardware processor of the computer by specifying switches to be set for the physical interconnections in the hardware processor of the computer.

Example 15. The method of any one of Examples 1-12, wherein analyzing at least the set of instructions, as the set of arithmetic operations, to select the at least one of the possible settings of the physical interconnections for the computing elements from the search space comprises:

performing a search within the search space of the possible settings of the physical interconnections for the computing elements using a path finding algorithm.

Example 16. The method of any one of Examples 1-12, wherein analyzing at least the set of instructions, as the set of arithmetic operations, to select the at least one of the possible settings of the physical interconnections for the computing elements from the search space comprises:
performing a search within the search space of the possible settings of the physical interconnections for the computing elements using a reinforcement learning algorithm.

Similar operations and processes as described in Examples 1 to 16 can be performed in a system comprising at least one processor and a memory communicatively coupled to the at least one processor where the memory stores instructions that when executed cause the at least one processor to perform the operations. Further, a non-transitory computer-readable medium storing instructions which, when executed, cause at least one processor to perform the operations as describes in any one of the Examples 1 to 16 can also be implemented. In addition, various system and apparatus implementations can be realized, including as detailed in the following Examples.

Example 17. A computer system comprising:
a hardware processor comprising multiple computing elements, interconnection switches among the multiple computing elements, and input-control switches for the multiple computing elements, wherein each computing element in the multiple computing elements is connected to each other computing element in the multiple computing elements through at least one of the interconnection switches, and wherein each computing element in the multiple computing elements is connected to input through at least one of the input-control switches; and
an architecture switch unit configured to set the interconnection switches and the input-control switches in the hardware processor according to received settings to reconfigure the multiple computing elements to define an arrangement of logic gates in the hardware processor for executing instructions of one or more computer programs, wherein setting a switch is turning the switch on or off.

Example 18. The computer system of Example 17, wherein the computing elements comprise transistors, and the received settings define the arrangement of logic gates by forming at least one of the logic gates by connecting some of the transistors using at least one of the interconnection switches.

Example 19. The computer system of Example 17, wherein the computing elements comprise predefined logic gates, and the received setting define the arrangement of logic gates by connecting some of the predefined logic gates using at least one of the interconnection switches.

Example 20. The computer system of any on of Examples 17-19, comprising a second processor different from the hardware processor, the second processor having a predefined processing architecture and being configured to analyze the instructions to select the settings received by the architecture switch to reconfigure the multiple computing elements of the hardware processor to execute the instructions.

Example 21. The computer system of Example 20, wherein the second processor is configured to analyze the instructions by being configured to:
partition the instructions to determine variants of arithmetic operations in the instructions;
sort elements of the variants of the arithmetic operations; and
determine, based on at least a result of the sort, which of the variants of the arithmetic operations to use, a number of clock cycles needed, an execution order of the instructions, and which instructions will be executed in which of one or more consecutive clock cycles.

Example 22. The computer system of Example 21, wherein the second processor is configured to divide the instructions into two or more proper subsets of the instructions that will be executed in parallel in at least one of the one or more consecutive clock cycles.

Example 23. The computer system of Example 22, wherein the instructions are from two or more independent computer programs.

Example 24. The computer system of any one of Examples 20-23, wherein the second processor is configured to determine whether or not the instructions can be executed using the second processor having the predefined processing architecture in less time than it would take to complete analysis of the instructions, reconfigure the hardware processor to execute the instructions and execute the instructions using the hardware processor of the computer.

Example 25. The computer system of Example 24, wherein the second processor is contained within a shared computer housing that also contains the architecture switch unit and the hardware processor.

Example 26. The computer system of Example 24, wherein the second processor is configured to communicate over a computer network to operate the architecture switch unit.

Example 27. The computer system of any one of Examples 20-26, wherein the second processor is configured to run controlling software for operating the architecture switch unit.

Example 28. The computer system of any one of Examples 20-27, wherein the architecture switch unit, the hardware processor, and the second processor are integrated together on a single system-on-chip (SoC).

Example 29. The computer system of any one of Examples 17-28, wherein the interconnection switches are aligned in more than one level of a multi-layer chip.

Example 30. An apparatus comprising:
switches coupled with computing elements in a hardware processor to enable selective formation of one or more cores from the computing elements in the hardware processor; and
means for dynamically determining how many of the one or more cores to form in the hardware processor, by provision of control signals to the switches, to execute instructions of one or more computer programs based on (i) a current set of the instructions to be executed and (ii) a current set of the computing elements available for processing instructions.

What is claimed is:
1. A method comprising:
receiving a set of instructions to be run on a computer comprising computing elements in a hardware processor of the computer and physical interconnections for the computing elements, wherein the set of instructions collectively define a search space of possible settings of the physical interconnections for the computing elements;
analyzing at least the set of instructions, as a set of arithmetic operations, to select at least one of the possible settings of the physical interconnections for the computing elements from the search space, wherein the selected at least one of the possible settings specifies a processing architecture tailored for executing the set of instructions; and providing the selected at least one of the possible settings of the physical interconnections for the computing elements to form the processing architecture tailored for executing the set of instructions.

2. The method of claim 1, wherein the computing elements comprise transistors, predefined logic gates, predefined sets of logic gates, or a combination thereof, and the method comprises:

setting switches for the physical interconnections in the hardware processor of the computer according to the selected at least one of the possible settings of the physical interconnections for the computing elements, wherein setting a switch is turning the switch on or off; and executing the set of instructions using the hardware processor of the computer.

3. The method of claim 2, wherein setting the switches comprises setting a minimum number of switches required to execute the set of instructions using the hardware processor of the computer.

4. The method of claim 2, wherein the providing comprises providing a first matrix and second matrix, the first matrix having values that control the setting of the switches, the second matrix having input values for executing the set of instructions, and executing the set of instructions using the hardware processor of the computer comprises executing the set of instructions in a single clock cycle of the hardware processor of the computer.

5. The method of claim 2, wherein analyzing at least the set of instructions comprises:

determining that executing the set of instructions using the hardware processor of the computer requires two or more consecutive clock cycles of the hardware processor of the computer; and determining which portions of the set of instructions will be executed in which of the two or more consecutive clock cycles using the at least one of the possible settings of the physical interconnections for the computing elements in the hardware processor of the computer.

6. The method of claim 5, wherein the at least one of the possible settings is two or more of the possible settings, and different ones of the two or more of the possible settings are used in at least two of the two or more consecutive clock cycles of the hardware processor of the computer.

7. The method of claim 1, comprising:

receiving one or more assembler commands or assembler instructions; and setting switches for the physical interconnections in the hardware processor of the computer in response to the one or more assembler commands or assembler instructions to control tailoring of a processing architecture of the hardware processor.

8. The method of claim 1, wherein the set of instructions are instructions from one or more computer programs, and the analyzing comprises:

partitioning the instructions to determine variants of arithmetic operations in the instructions;

sorting elements of the variants of the arithmetic operations; and determining, based on at least a result of the sorting, (i) which of the variants of the arithmetic operations to use, (ii) a number of clock cycles needed, (iii) an execution order of the instructions, and (iv) which instructions will be executed in which of one or more consecutive clock cycles.

9. The method of claim 8, comprising dividing the instructions into two or more proper subsets of the instructions that will be executed in parallel in at least one of the one or more consecutive clock cycles.

10. The method of claim 9, wherein the instructions are from two or more independent computer programs.

11. The method of claim 1, wherein the receiving is done by a second processor different from the hardware processor, the second processor having a predefined processing architecture, and the method comprises:

determining, by the second processor, that the set of instructions cannot be executed using the second processor having the predefined processing architecture in less time than it would take to complete analysis of the set of instructions, form the processing architecture tailored for executing the set of instructions in the hardware processor and execute the set of instructions using the hardware processor of the computer.

12. The method of claim 11, wherein the set of instructions is a first set of instructions, and the method comprises:

receiving, by the second processor, a second set of instructions different from the first set of instructions;

determining, by the second processor, that the second set of instructions can be executed on the second processor in less time than it would take to complete analysis of the second set of instructions, form a processing architecture tailored for executing the second set of instructions in the hardware processor and execute the second set of instructions using the hardware processor of the computer; and executing the second set of instructions using the second processor having the predefined processing architecture.

13. The method of claim 1, wherein the computing elements comprise transistors, and the at least one of the possible settings of the physical interconnections for the computing elements forms a set of logic gates from the transistors and input-to-output links between logic gates in the set of logic gates by specifying switches to be set for the physical interconnections in the hardware processor of the computer.

14. The method of claim 1, wherein the computing elements comprise predefined logic gates, and the at least one of the possible settings of the physical interconnections for the computing elements forms input-to-output links between the predefined logic gates in the hardware processor of the computer by specifying switches to be set for the physical interconnections in the hardware processor of the computer.

15. The method of claim 1, wherein analyzing at least the set of instructions, as the set of arithmetic operations, to select the at least one of the possible settings of the physical interconnections for the computing elements from the search space comprises:

performing a search within the search space of the possible settings of the physical interconnections for the computing elements using a path finding algorithm.

16. The method of claim 1, wherein analyzing at least the set of instructions, as the set of arithmetic operations, to select the at least one of the possible settings of the physical interconnections for the computing elements from the search space comprises:

performing a search within the search space of the possible settings of the physical interconnections for the computing elements using a reinforcement learning algorithm.

* * * * *